(12) United States Patent
Heckmeier et al.

(10) Patent No.: US 7,449,222 B2
(45) Date of Patent: *Nov. 11, 2008

(54) LIQUID-CRYSTALLINE MEDIUM

(75) Inventors: Michael Heckmeier, Hemsbach (DE);
Melanie Klasen-Memmer,
Heuchelheim (DE); Georg Luessem,
Peterhausen (DE); Eike Poetsch,
Muchltal (DE); Peer Kirsch,
Seeheim-Jugenheim (DE); Marcus Reuter, Darmstadt (DE); Brigitte Schuler, Grossostheim (DE); Izumi Saito, Darmstadt (DE)

(73) Assignee: Merck Patent Gesellschaft Mit Beschrankter Haftung, Darmstadt (DE)

( * ) Notice: Subject to any disclaimer, the term of this patent is extended or adjusted under 35 U.S.C. 154(b) by 0 days.

This patent is subject to a terminal disclaimer.

(21) Appl. No.: 11/014,185

(22) Filed: Dec. 17, 2004

(65) Prior Publication Data

US 2005/0205842 A1    Sep. 22, 2005

(30) Foreign Application Priority Data

Dec. 17, 2003   (DE) .................................. 10359470

(51) Int. Cl.
*C09K 19/34* (2006.01)
*C09K 19/30* (2006.01)
*C09K 19/12* (2006.01)

(52) U.S. Cl. .............. 428/1.1; 252/299.61; 252/299.63; 252/299.66

(58) Field of Classification Search ............ 252/299.61, 252/299.63, 299.67, 299.66; 428/1.1
See application file for complete search history.

(56) References Cited

U.S. PATENT DOCUMENTS

| | | | |
|---|---|---|---|
| 6,329,027 B1 * | 12/2001 | Kondo et al. ................. 428/1.1 |
| 6,902,777 B2 * | 6/2005 | Hirschmann et al. .......... 428/1.1 |
| 7,056,561 B2 * | 6/2006 | Heckmeier et al. ............ 428/1.1 |
| 7,175,891 B2 * | 2/2007 | Heckmeier et al. ............ 428/1.3 |
| 7,189,440 B2 * | 3/2007 | Manabe et al. ................ 428/1.3 |
| 2003/0234384 A1 * | 12/2003 | Heckmeier et al. ..... 252/299.63 |
| 2004/0112275 A1 * | 6/2004 | Heckmeier et al. .............. 117/2 |
| 2005/0179007 A1 * | 8/2005 | Manabe et al. ......... 252/299.61 |

FOREIGN PATENT DOCUMENTS

DE    10318420    * 11/2004
EP    1335014     * 8/2003

* cited by examiner

*Primary Examiner*—Shean C Wu
(74) *Attorney, Agent, or Firm*—Millen, White, Zelano & Branigan, P.C.

(57) ABSTRACT

The invention relates to a liquid-crystalline medium based on a mixture of polar compounds of positive dielectric anisotropy, comprising at least one pyran compound of the formula I $$R-\left(A\right)_m-P-Z^1-\left(B\right)_n-Z^2-\underset{L^2}{\overset{L^1}{\underset{|}{\underset{|}{\bigcirc}}}}-X$$

I and one or more compounds selected from the group consisting of the compounds C1 to C9

C1: $R^1-H-\bigcirc(F,F)-X^1$

C2: $R^1-H-C_2H_4-H-\bigcirc(F,F)-X^1$

C3: $R^1-H-H-C_2H_4-\bigcirc(F,F)-X^1$

C4: $R^1-H-C_2H_4-\bigcirc-\bigcirc(F,F)-X^1$

C5: $R^1-H-H-\bigcirc(F,F)-F$

C6: $R^1-H-H-C_2H_4-\bigcirc-\bigcirc(F,F)-X^1$

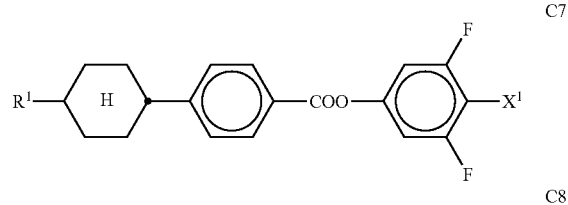
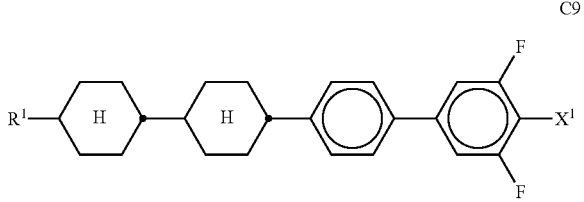
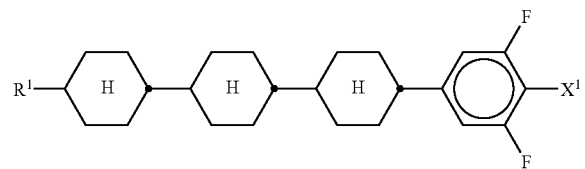
in which
R, $R^1$, the rings A, B and P, $L^1$, $L^2$, X, $X^1$, $Z^1$, $Z^2$, m and n are as defined in Claim 1, and to electro-optical displays containing a liquid-crystalline medium of this type.
20 Claims, No Drawings

LIQUID-CRYSTALLINE MEDIUM

The present invention relates to a liquid-crystalline medium, to the use thereof for electro-optical purposes, and to displays containing this medium.

Liquid crystals are used principally as dielectrics in display devices, since the optical properties of such substances can be modified by an applied voltage. Electro-optical devices based on liquid crystals are extremely well known to the person skilled in the art and can be based on various effects. Examples of such devices are cells having dynamic scattering, DAP (deformation of aligned phases) cells, guest/host cells, TN cells having a twisted nematic structure, STN (supertwisted nematic) cells, SBE (super-birefringence effect) cells and OMI (optical mode interference) cells. The commonest display devices are based on the Schadt-Helfrich effect and have a twisted nematic structure.

The liquid-crystal materials must have good chemical and thermal stability and good stability to electric fields and electromagnetic radiation. Furthermore, the liquid-crystal materials should have low viscosity and produce short addressing times, low threshold voltages and high contrast in the cells.

They should furthermore have a suitable mesophase, for example a nematic or cholesteric mesophase for the above-mentioned cells, at the usual operating temperatures, i.e. in the broadest possible range above and below room temperature. Since liquid crystals are generally used as mixtures of a plurality of components, it is important that the components are readily miscible with one another. Further properties, such as the electrical conductivity, the dielectric anisotropy and the optical anisotropy, have to satisfy various requirements depending on the cell type and area of application. For example, materials for cells having a twisted nematic structure should have positive dielectric anisotropy and low electrical conductivity.

For example, for matrix liquid-crystal displays with integrated non-linear elements for switching individual pixels (MLC displays), media having large positive dielectric anisotropy, broad nematic phases, relatively low birefringence, very high specific resistance, good UV and temperature stability and low vapour pressure are desired.

Matrix liquid-crystal displays of this type are known. Non-linear elements which can be used for individual switching of the individual pixels are, for example, active elements (i.e. transistors). The term "active matrix" is then used, where a distinction can be made between two types:
1. MOS (metal oxide semiconductor) or other diodes on a silicon wafer as substrate.
2. Thin-film transistors (TFTs) on a glass plate as substrate.

The use of single-crystal silicon as substrate material restricts the display size, since even modular assembly of various part-displays results in problems at the joints.

In the case of the more promising type 2, which is preferred, the electro-optical effect used is usually the TN effect. A distinction is made between two technologies: TFTs comprising compound semiconductors, such as, for example, CdSe, or TFTs based on polycrystalline or amorphous silicon. Intensive work is being carried out worldwide on the latter technology.

The TFT matrix is applied to the inside of one glass plate of the display, while the other glass plate carries the transparent counterelectrode on its inside. Compared with the size of the pixel electrode, the TFT is very small and has virtually no adverse effect on the image. This technology can also be extended to fully colour-capable displays, in which a mosaic of red, green and blue filters is arranged in such a way that a filter element is opposite each switchable pixel.

The TFT displays usually operate as TN cells with crossed polarisers in transmission and are back-lit.

The term MLC displays here covers any matrix display with integrated non-linear elements, i.e., besides the active matrix, also displays with passive elements, such as varistors or diodes (MIM=metal-insulator-metal).

MLC displays of this type are particularly suitable for TV applications (for example pocket TVs) or for high-information displays for computer applications (laptops) and in automobile or aircraft construction. Besides problems regarding the angle dependence of the contrast and the response times, difficulties also arise in MLC displays due to insufficiently high specific resistance of the liquid-crystal mixtures [TOGASHI, S., SEKIGUCHI, K., TANABE, H., YAMAMOTO, E., SORIMACHI, K., TAJIMA, E., WATANABE, H., SHIMIZU, H., Proc. Eurodisplay 84, September 1984: A 210-288 Matrix LCD Controlled by Double Stage Diode Rings, p. 141 ff, Paris; STROMER, M., Proc. Eurodisplay 84, September 1984: Design of Thin Film Transistors for Matrix Addressing of Television Liquid Crystal Displays, p. 145 ff, Paris]. With decreasing resistance, the contrast of an MLC display deteriorates, and the problem of after-image elimination may occur. Since the specific resistance of the liquid-crystal mixture generally drops over the life of an MLC display owing to interaction with the interior surfaces of the display, a high (initial) resistance is very important in order to obtain acceptable service lives. In particular in the case of low-volt mixtures, it was hitherto impossible to achieve very high specific resistance values. It is furthermore important that the specific resistance exhibits the smallest possible increase with increasing temperature and after heating and/or UV exposure. The low-temperature properties of the mixtures from the prior art are also particularly disadvantageous. It is demanded that no crystallisation and/or smectic phases occur, even at low temperatures, and the temperature dependence of the viscosity is as low as possible. The MLC displays known from the prior art do not meet today's requirements.

In addition to liquid-crystal displays which use back-lighting, i.e. are operated transmissively and if desired transflectively, reflective liquid-crystal displays are also particularly interesting. These reflective liquid-crystal displays use the ambient light for information display. They thus consume significantly less energy than back-lit liquid-crystal displays having a corresponding size and resolution. Since the TN effect is characterised by very good contrast, reflective displays of this type can even be read well in bright ambient conditions. This is already known of simple reflective TN displays, as used, for example, in watches and pocket calculators. However, the principle can also be applied to high-quality, higher-resolution active matrix-addressed displays, such as, for example, TFT displays. Here, as already in the transmissive TFT-TN displays which are generally conventional, the use of liquid crystals of low birefringence ($\Delta n$) is necessary in order to achieve low optical retardation ($d \cdot \Delta n$). This low optical retardation results in usually acceptable low viewing-angle dependence of the contrast (cf. DE 30 22 818). In reflective displays, the use of liquid crystals of low birefringence is even more important than in transmissive displays since the effective layer thickness through which the light passes is approximately twice as large in reflective displays as in transmissive displays having the same layer thickness.

There thus continues to be a great demand for MLC displays having very high specific resistance at the same time as a large working-temperature range, short response times even at low temperatures and low threshold voltage which do not have these disadvantages or only do so to a lesser extent.

In TN (Schadt-Helfrich) cells, media are desired which facilitate the following advantages in the cells:
- extended nematic phase range (in particular down to low temperatures)
- the ability to switch at extremely low temperatures (outdoor use, automobile, avionics)
- increased resistance to UV radiation (longer life)
- low optical birefringence for reflective applications
- low threshold voltage The media available from the prior art do not allow these advantages to be achieved while simultaneously retaining the other parameters.

In the case of supertwisted (STN) cells, media are desired which enable greater multiplexability and/or lower threshold voltages and/or broader nematic phase ranges (in particular at low temperatures). To this end, a further widening of the available parameter latitude (clearing point, smectic-nematic transition or melting point, viscosity, dielectric parameters, elastic parameters) is urgently desired.

The invention is based on the object of providing media, in particular for MLC, IPS, TN or STN displays of this type, which do not have the above-mentioned disadvantages or only do so to a lesser extent, and preferably at the same time have very high specific resistance values and low threshold voltages. This object requires liquid-crystalline compounds which have a high clearing point and low rotational viscosity.

It has now been found that this object can be achieved if use is made of the liquid-crystalline compounds of the formula I in combination with compounds of the formulae C1 to C9.

Mixtures of this type are distinguished by low rotational viscosities and are therefore particularly suitable for monitor applications. Furthermore, the compounds of the formula I and of the formulae C1 to C9 result in a reduction in the threshold voltage and/or the optical anisotropy in liquid-crystalline mixtures, reducing the power consumption for mobile applications and improving the optical properties.

The invention thus relates to a liquid-crystalline medium based on a mixture of polar compounds, comprising one or more pyran compounds of the formula I

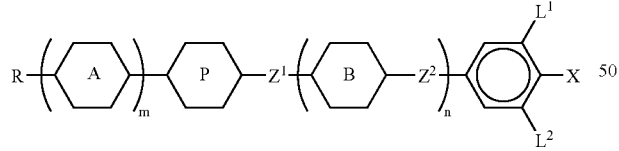

I and one or more compounds selected from the group consisting of the compounds C1 to C9

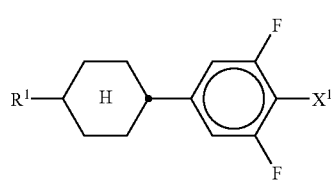

C1

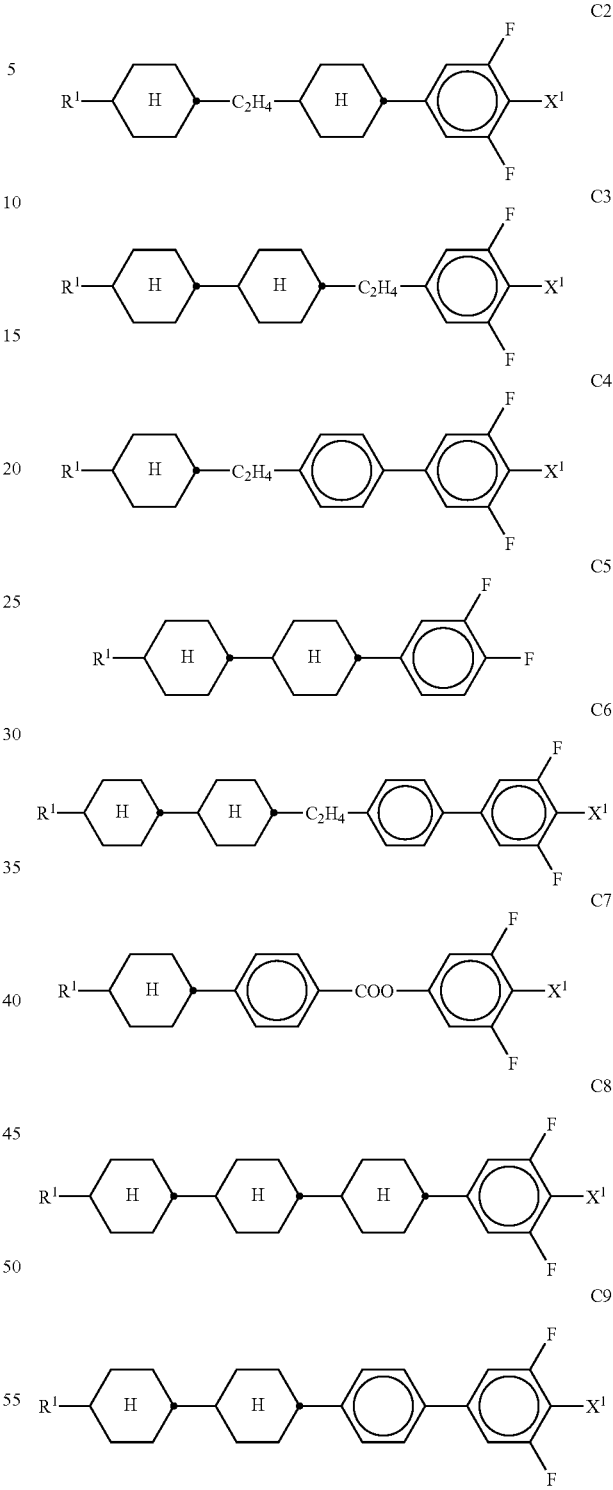

in which
R and $R^1$ are each, independently of one another, H, a halogenated or unsubstituted alkyl or alkoxy radical having from 1 to 15 carbon atoms, where one or more $CH_2$ groups in these radicals may each, independently of one another, be replaced by —C≡C—, —CH=CH—, —O—, —CO—O—, —O—CO—,

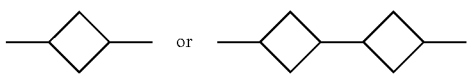

in such a way that O atoms are not linked directly to one another,

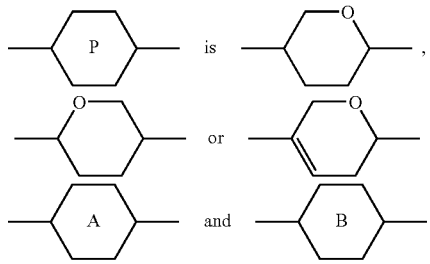

are each, independently of one another,

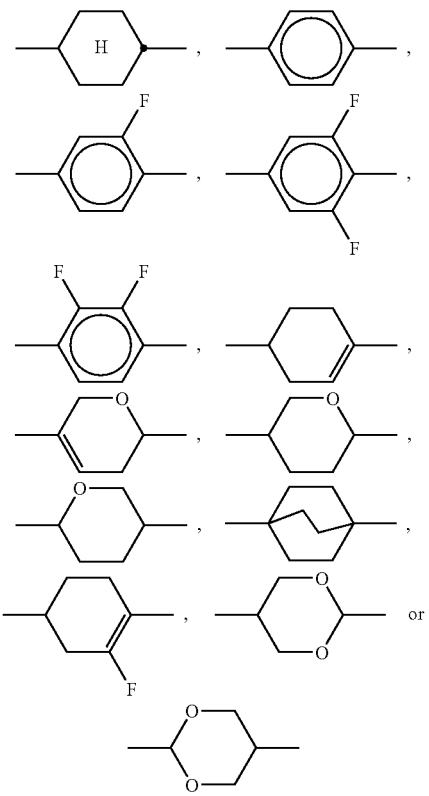

X and $X^1$ are each, independently of one another, F, Cl, CN, $SF_5$, NCS, a halogenated alkyl radical having up to 8 carbon atoms, where one or more $CH_2$ groups may be replaced by —O— or —CH═CH— in such a way that O atoms are not linked directly to one another, $Z^1$ and $Z^2$ are each, independently of one another, —COO—, —OCO—, —$CH_2$O—, —O$CH_2$—, —$CF_2CF_2$—, —CF═CF—, —C≡C—, —$CF_2$O—, —O$CF_2$—, —CH═CF—, —CF═CH—, —$CH_2CH_2$—, —$(CH_2)_4$—, —CH═CH— or a single bond, $L^1$ and $L^2$ are each, independently of one another, H or F, and m and n are each, independently of one another, 0, 1, 2 or 3, where m+n is ≦3.

The compounds of the formula I and of the formulae C1 to C9 are colourless in the pure state and generally form liquid-crystalline mesophases in a temperature range which is favourably located for electro-optical use.

Preferred radicals of the compounds of the formulae I and C1 to C9 are indicated below.

X and/or $X^1$ in the compounds of the formulae I and C1 to C9 are preferably F, Cl, CN, NCS, $CF_3$, $C_2F_5$, $C_3F_7$, $SF_5$, $CF_2H$, $OCF_3$, $OCF_2H$, $OCFHCF_3$, $OCFHCFH_2$, $OCFHCF_2H$, $OCF_2CH_3$, $OCF_2CFH_2$, $OCF_2CF_2H$, $OCF_2CF_2CF_2H$, $OCF_2CF_2CFH_2$, $OCFHCF_2CF_3$, $OCFHCF_2CF_2H$, $OCFHCFHCF_3$, $OCH_2CF_2CF_3$, $OCF_2CF_2CF_3$, $OCF_2CFHCFH_2$, $OCF_2CH_2CF_2H$, $OCFHCF_2CFH_2$, $OCFHCFHCF_2H$, $OCFHCH_2CF_3$, $OCH_2CFHCF_3$, $OCH_2CF_2CF_2H$, $OCF_2CFHCH_3$, $OCF_2CH_2CFH_2$, $OCFHCF_2CH_3$, $OCFHCFHCFH_2$, $OCFHCH_2CF_3$, $OCH_2CF_2CFH_2$, $OCH_2CFHCF_2H$, $OCF_2CH_2CH_3$, $OCFHCFHCH_3$, $OCFHCH_2CFH_2$, $OCH_2CF_2CH_3$, $OCH_2CFHCFH_2$, $OCH_2CH_2CF_2H$, $OCHCH_2CH_3$, $OCH_2CFHCH_3$, $OCH_2CH_2CF_2H$, $OCClFCF_3$, $OCClFCClF_2$, $OCClFCFH_2$, $OCFHCCl_2F$, $OCClFCF_2H$, $OCClFCClF_2$, $OCF_2CClH_2$, $OCF_2CCl_2H$, $OCF_2CCl_2F$, $OCF_2CClFH$, $OCF_2CClF_2$, $OCF_2CF_2CClF_2$, $OCF_2CF_2CCl_2F$, $OCClFCF_2CF_3$, $OCClFCF_2CF_2H$, $OCClFCF_2CClF_2$, $OCClFCFHCF_3$, $OCClFCClFCF_3$, $OCCl_2CF_2CF_3$, $OCClHCF_2CF_3$, $OCClFCF_2CF_3$, $OCClFCClFCF_3$, $OCF_2CClFCFH_2$, $OCF_2CF_2CCl_2F$, $OCF_2CCl_2CF_2H$, $OCF_2CH_2CClF_2$, $OCClFCF_2CFH_2$, $OCFHCF_2CCl_2F$, $OCClFCFHCF_2H$, $OCClFCClFCF_2H$, $OCFHCFHCClF_2$, $OCClFCH_2CF_3$, $OCFHCCl_2CF_3$, $OCCl_2CFHCF_3$, $OCH_2CClFCF_3$, $OCCl_2CF_2CF_2H$, $OCH_2CF_2CClF_2$, $OCF_2CClFCH_3$, $OCF_2CFHCCl_2H$, $OCF_2CCl_2CFH_2$, $OCF_2CH_2CCl_2F$, $OCClFCF_2CH_3$, $OCFHCF_2CCl_2H$, $OCClFCClFCFH_2$, $OCFHCFHCCl_2F$, $OCClFCH_2CF_3$, $OCFHCCl_2CF_3$, $OCCl_2CF_2CFH_2$, $OCH_2CF_2CCl_2F$, $OCCl_2CFHCF_2H$, $OCClHCClFCF_2H$, $OCF_2CClHCClH_2$, $OCF_2CH_2CCl_2H$, $OCClFCFHCH_3$, $OCF_2CClFCCl_2H$, $OCClFCH_2CFH_2$, $OCFHCCl_2CFH_2$, $OCCl_2CF_2CH_3$, $OCH_2CF_2CClH_2$, $OCCl_2CFHCF_2H$, $OCH_2CClFCFCl_2$, $OCH_2CH_2CF_2H$, $OCClHCClHCF_2H$, $OCH_2CCl_2CF_2H$, $OCClFCH_2CH_3$, $OCFHCH_2CCl_2H$, $OCClHCFHCClH_2$, $OCH_2CFHCCl_2H$, $OCCl_2CH_2CF_2H$, $OCH_2CCl_2CF_2H$, CH═$CF_2$, CF═$CF_2$, OCH═$CF_2$, OCF═$CF_2$, CH═CHF, OCH═CHF, CF═CHF, OCF═CHF, in particular F, Cl, CN, NCS, $CF_3$, $SF_5$, $CF_2H$, $OCF_3$, $OCF_2H$, $OCFHCF_3$, $OCFHCFH_2$, $OCFHCF_2H$, $OCF_2CH_3$, $OCF_2CFH_2$, $OCF_2CF_2H$, $OCF_2CF_2CF_2H$, $OCF_2CF_2CFH_2$, $OCFHCF_2CF_3$, $OCFHCF_2CF_2H$, $OCF_2CF_2CF_3$ or $OCF_2CHFCF_3$.

The ring P is preferably

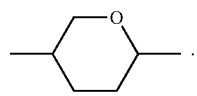

The rings A and B are preferably

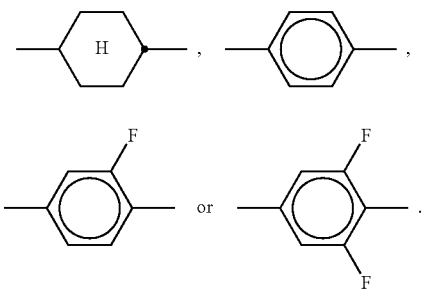

If the rings A and B are present more than once, the rings may, independently of one another, have identical or different meanings.

$Z^1$ and $Z^2$ are preferably a single bond.

X is particularly preferably F or $OCF_3$, and $X^1$ is preferably F or Cl.

Preferred smaller groups of compounds of the formula I are those of the sub-formulae I1 to I15:

I1
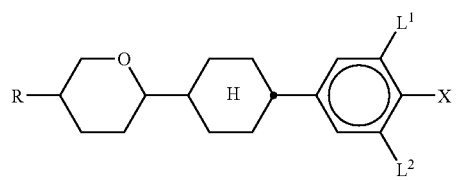

I2
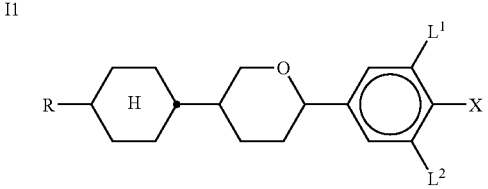

I3
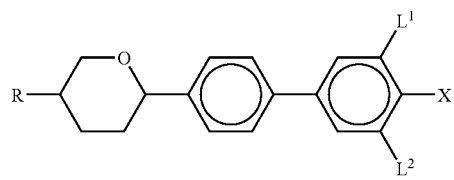

I4
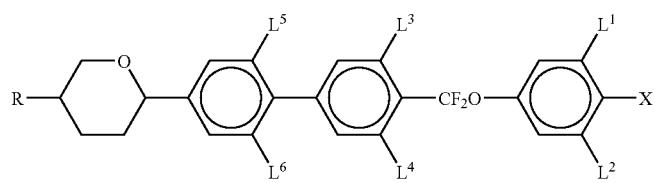

I5
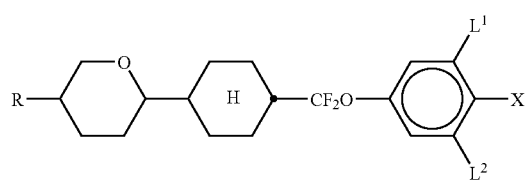

I6
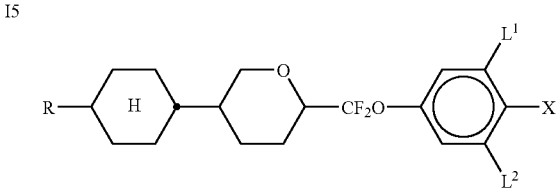

I7
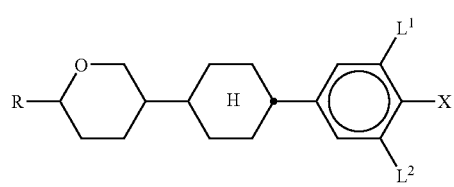

I8
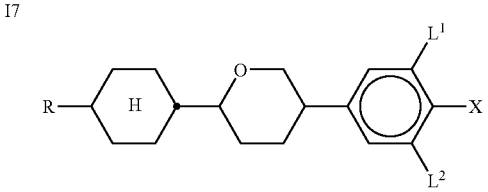

I9
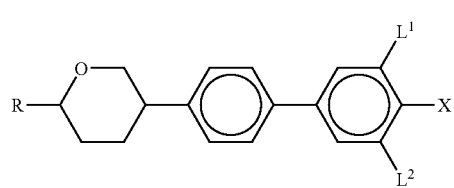

-continued

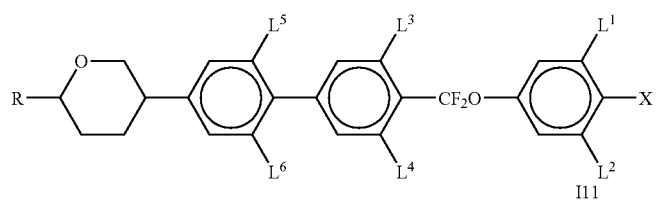

I10

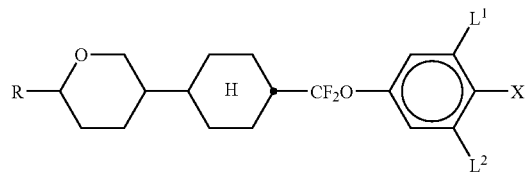

I11

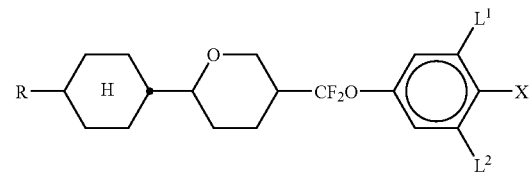

I12

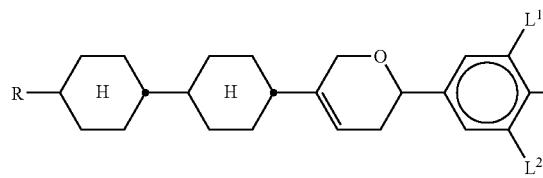

I13

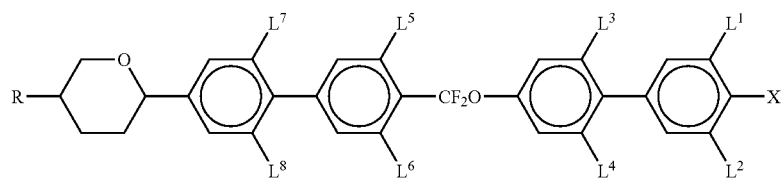

I14

I15 in which

R and X are as defined in Claim 1, and $L^{1-8}$ are each, independently of one another, H or F. X in the sub-formulae I1 to I5 is preferably F or $OCF_3$. Particular preference is given to compounds of the formula I6 in which X is F, furthermore $OCF_3$.

Particularly preferred media comprise one or more compounds selected from the group consisting of the compounds of the formulae

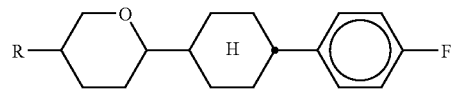

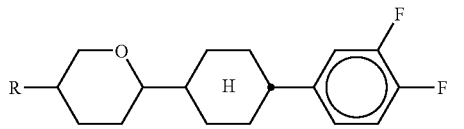

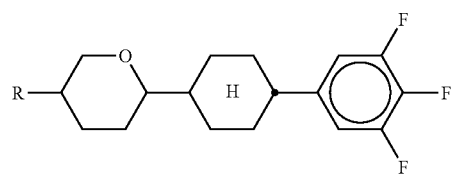

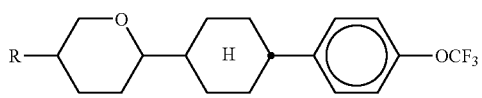

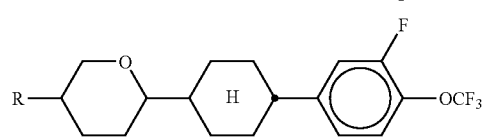

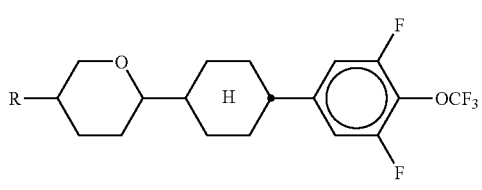

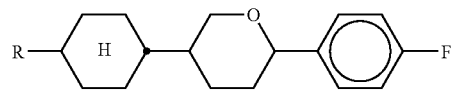

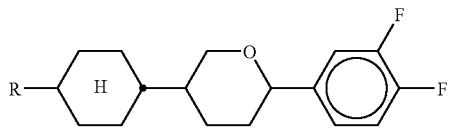

-continued
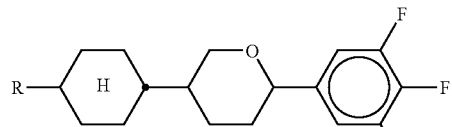
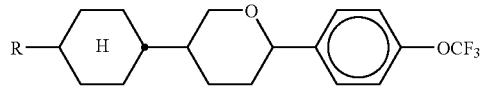
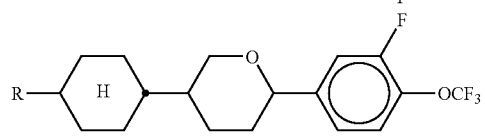
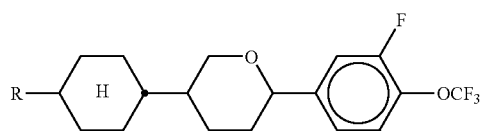
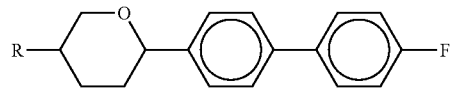
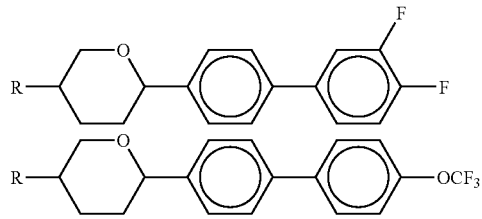
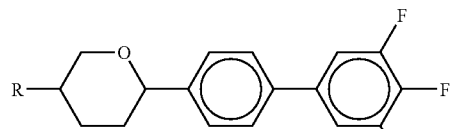
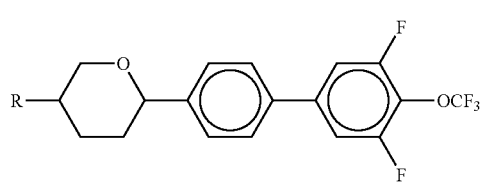
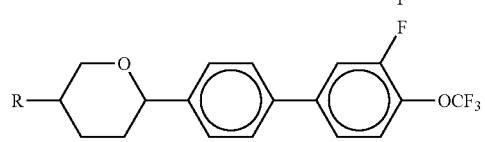
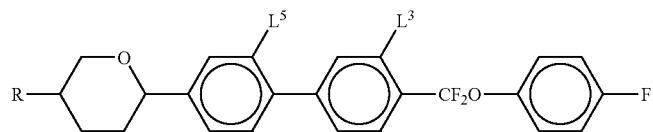
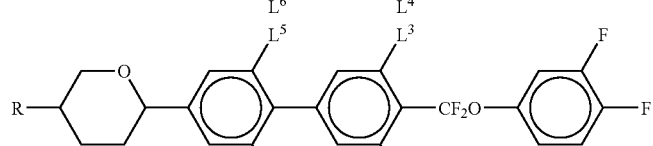
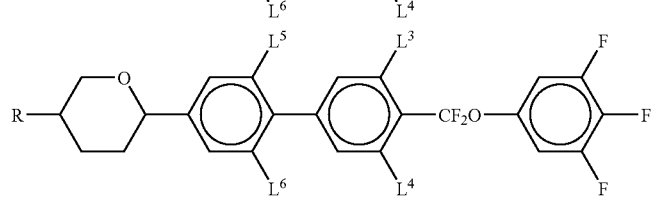
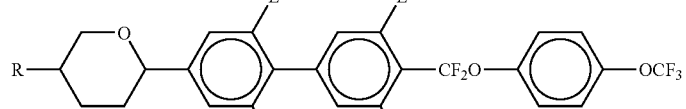
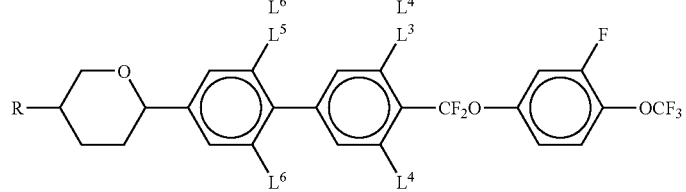

-continued
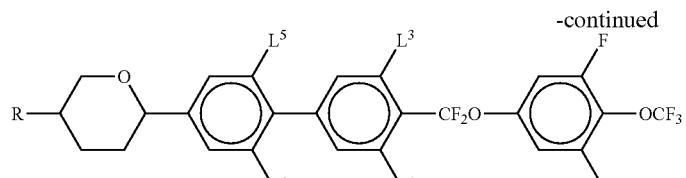
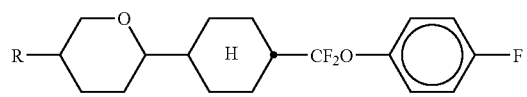
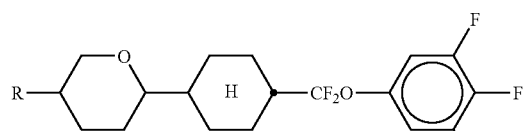
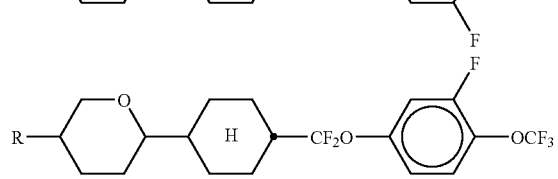
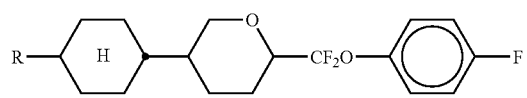
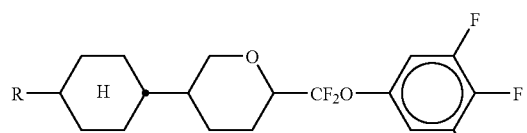
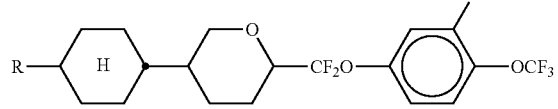
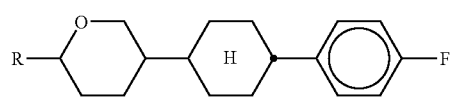
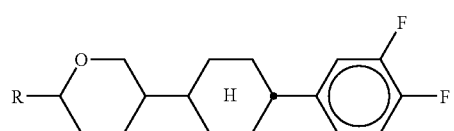
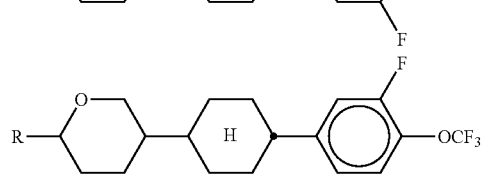
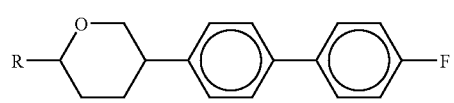
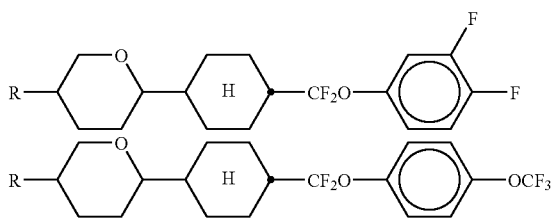
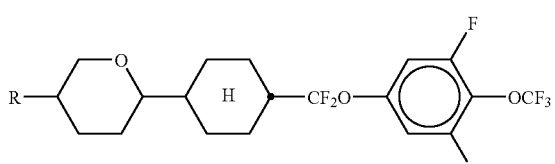
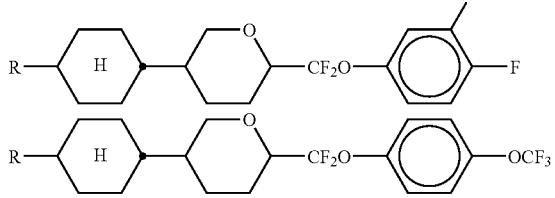
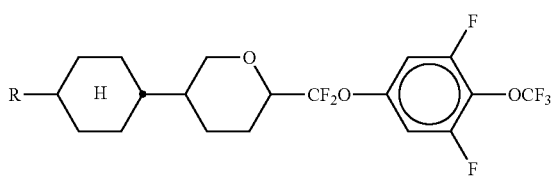
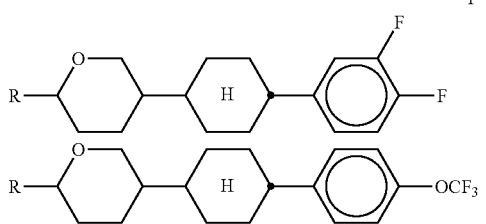
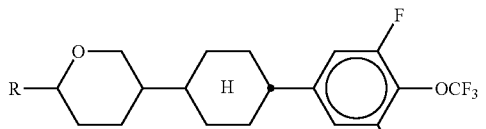
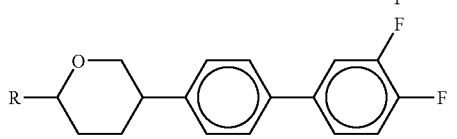

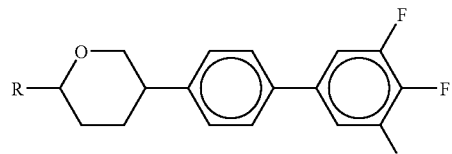
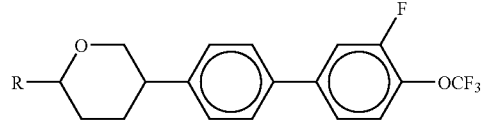
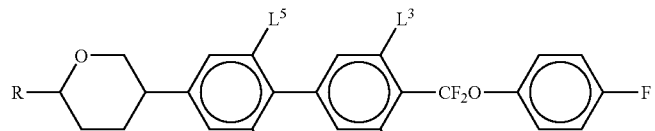
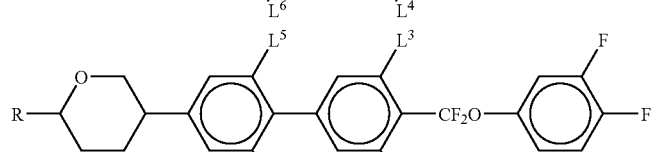
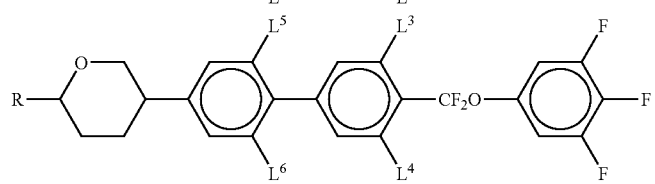
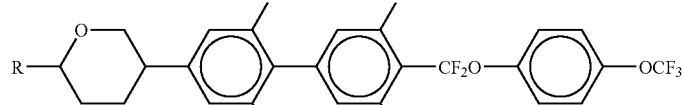
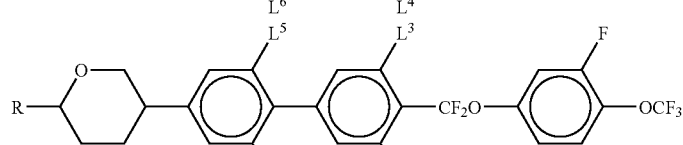
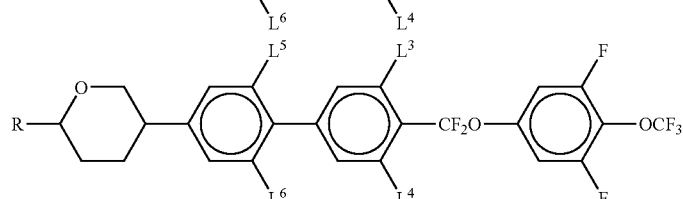
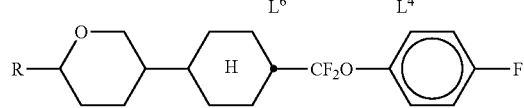
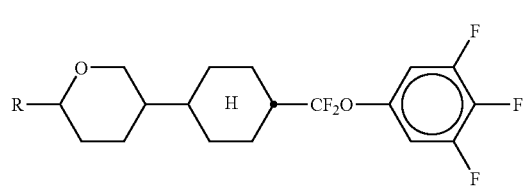
-continued
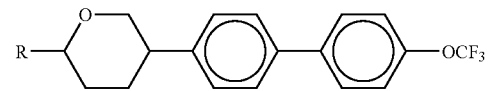
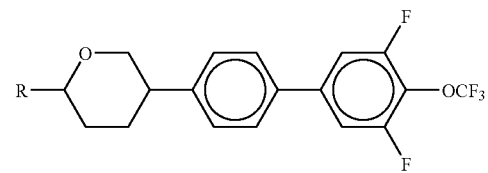
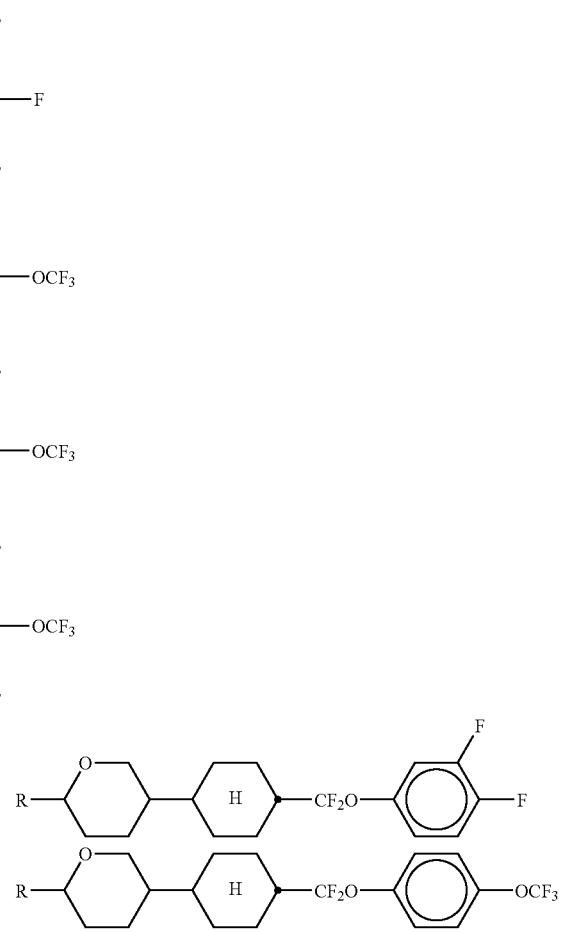

-continued
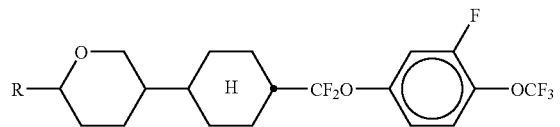
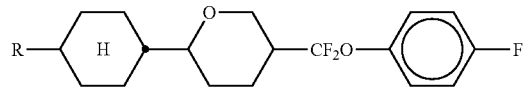
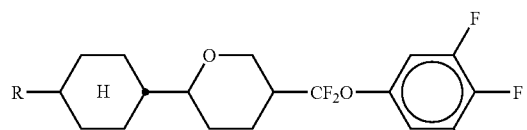
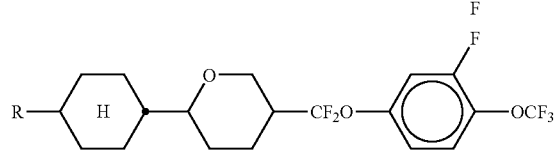
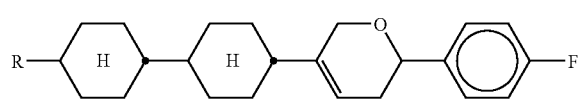
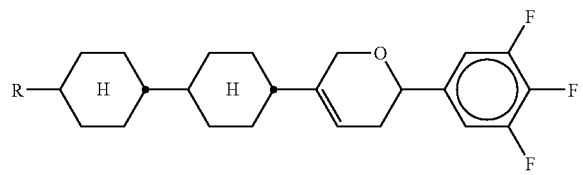
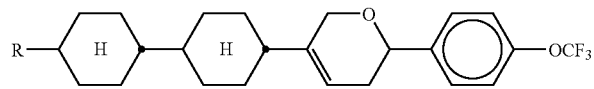
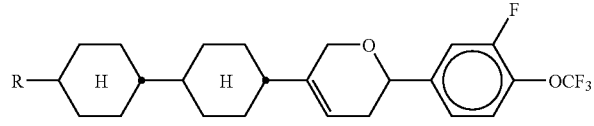
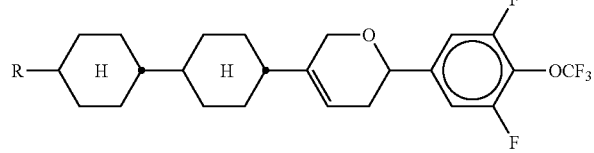
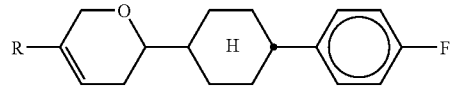
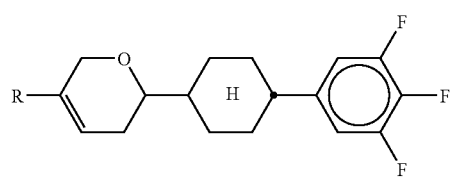
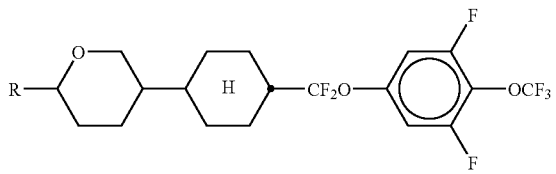
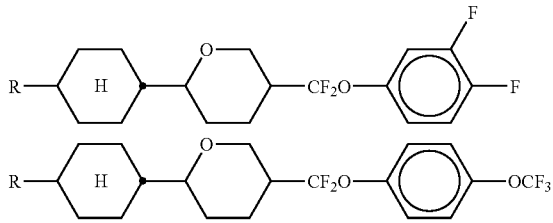
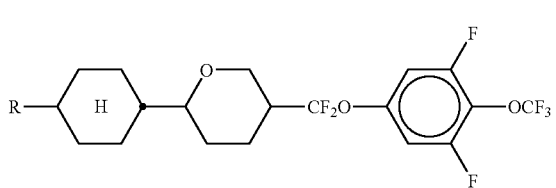
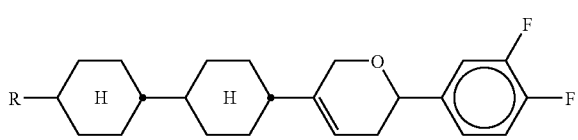
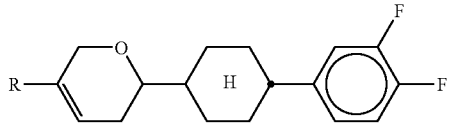
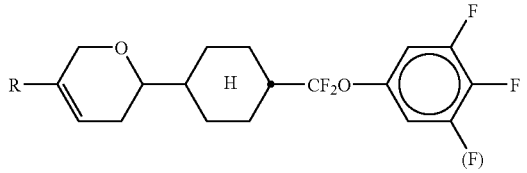

-continued

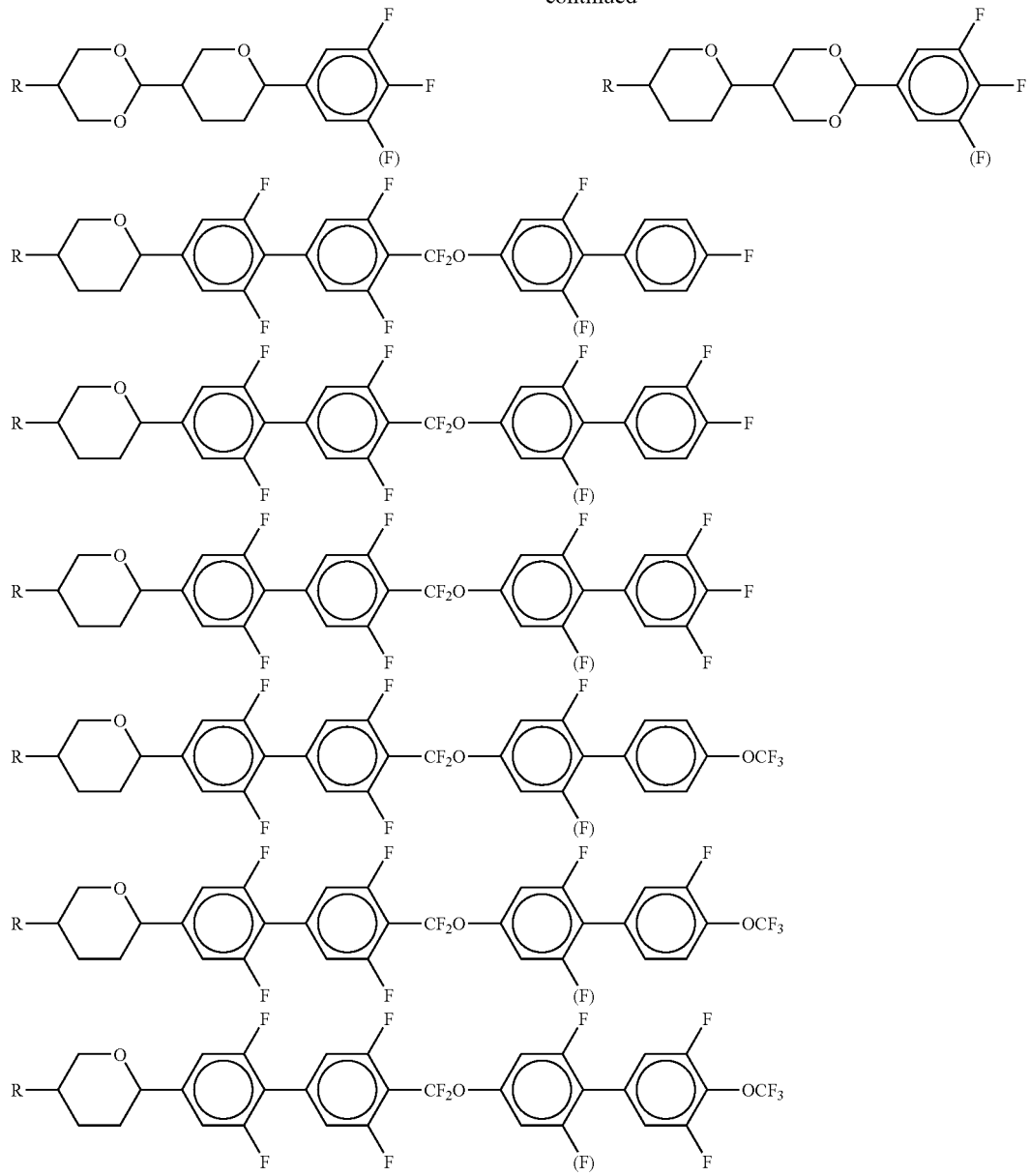

The compounds of the formula I are prepared by methods known per se, as described in the literature (for example in the standard works, such as Houben-Weyl, Methoden der Organischen Chemie [Methods of Organic Chemistry], Georg-Thieme-Verlag, Stuttgart), to be precise under reaction conditions which are known and suitable for the said reactions. Use can also be made here of variants which are known per se, but are not mentioned here in greater detail.

The invention also relates to electro-optical displays (in particular STN or MLC displays having two plane-parallel outer plates, which, together with a frame, form a cell, integrated non-linear elements for switching individual pixels on the outer plates, and a nematic liquid-crystal mixture of positive dielectric anisotropy and high specific resistance) which contain media of this type and to the use of these media for electro-optical purposes.

The liquid-crystal mixtures according to the invention enable a significant widening of the available parameter latitude. The achievable combinations of clearing point, optical anisotropy, viscosity at low temperature, thermal and UV stability and dielectric anisotropy are far superior to previous materials from the prior art.

The requirement for a high clearing point, a nematic phase at low temperature, as well as high $\Delta\varepsilon$ has hitherto only been met to an inadequate extent. Although liquid-crystal mixtures such as, for example, MLC-6476 and MLC-6625 (Merck KGaA, Darmstadt, Germany) have comparable clearing points and low-temperature stabilities, they have, however, relatively high $\Delta n$ values and also higher threshold voltages of about $\geq 1.7$ V.

Other mixture systems have comparable viscosities and values of $\Delta\varepsilon$, but only have clearing points in the region of 60° C.

The liquid-crystal mixtures according to the invention, while retaining the nematic phase down to −20° C. and preferably down to −30° C., particularly preferably down to −40° C., enable clearing points above 70° C., preferably above 75° C., particularly preferably ≧80° C., simultaneously dielectric anisotropy values ΔÅ of ≧6, preferably ≧7, and a high value for the specific resistance to be achieved, enabling excellent STN and MLC displays to be obtained. In particular, the mixtures are characterised by low operating voltages. The TN thresholds are below 1.5 V, preferably below 1.3 V.

It goes without saying that, through a suitable choice of the components of the mixtures according to the invention, it is also possible for higher clearing points (for example above 110°) to be achieved at a higher threshold voltage or lower clearing points to be achieved at lower threshold voltages with retention of the other advantageous properties. At viscosities correspondingly increased only slightly, it is likewise possible to obtain mixtures having greater ΔÅ and thus lower thresholds. The MLC displays according to the invention preferably operate at the first Gooch and Tarry transmission minimum [C. H. Gooch and H. A. Tarry, Electron. Lett. 10, 2-4, 1974; C. H. Gooch and H. A. Tarry, Appl. Phys., Vol. 8, 1575-1584, 1975], where, besides particularly favourable electro-optical properties, such as low angle dependence of the contrast (German Patent 30 22 818), a lower dielectric anisotropy is sufficient at the same threshold voltage as in an analogous display at the second minimum. This enables significantly higher specific resistance values to be achieved using the mixtures according to the invention at the first minimum than in the case of mixtures comprising cyano compounds. Through a suitable choice of the individual components and their proportions by weight, the person skilled in the art is able to set the birefringence necessary for a pre-specified layer thickness of the MLC display using simple routine methods.

The small Δn values enable the mixtures according to the invention to be used in low $V_{th}$, TN-TFT and IPS displays and for reflective or transflective display applications.

The flow viscosity $v_{20}$ at 20° C. is preferably <60 mm²·s⁻¹, particularly preferably <50 mm²·s⁻¹. The nematic phase range is preferably at least 90°, in particular at least 100°. This range preferably extends at least from −30° to +80°. The rotational viscosity $\gamma_1$ at 20° C. is preferably <200 mPa·s, in particular <180 mPa·s.

Measurements of the capacity holding ratio (HR) [S. Matsumoto et al., Liquid Crystals 5, 1320 (1989); K. Niwa et al., Proc. SID Conference, San Francisco, June 1984, p. 304 (1984); G. Weber et al., Liquid Crystals 5, 1381 (1989)] have shown that mixtures according to the invention comprising compounds of the formula I exhibit a significantly smaller decrease in the HR with increasing temperature than analogous mixtures comprising cyanophenylcyclohexanes of the formula

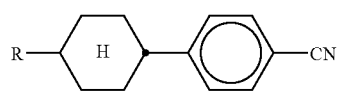

or esters of the formula

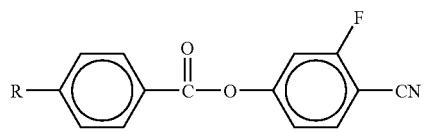

instead of the compounds of the formula I.

The UV stability of the mixtures according to the invention is also considerably better, i.e. they exhibit a significantly smaller decrease in the HR on exposure to UV. The mixtures according to the invention have values for the holding ratio of >98%, in particular >99%.

The media according to the invention are preferably based on one or more (preferably one, two, three or more) compounds of the formula I, i.e. the proportion of these compounds is 5-95%, preferably 10-60% and particularly preferably in the range 15-40%.

The individual compounds of the formulae I to X and C1 to C9 and their sub-formulae which can be used in the media according to the invention are either known or they can be prepared analogously to the known compounds.

Preferred embodiments are indicated below:

The medium additionally comprises one or more compounds selected from the group consisting of the general formulae II to X:

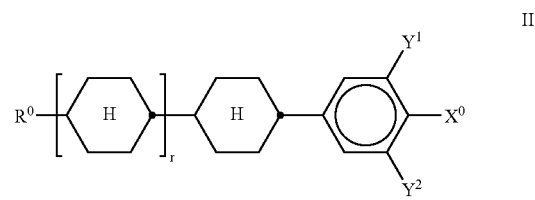

II

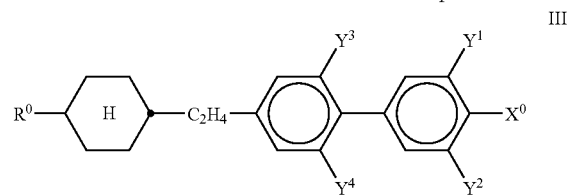

III

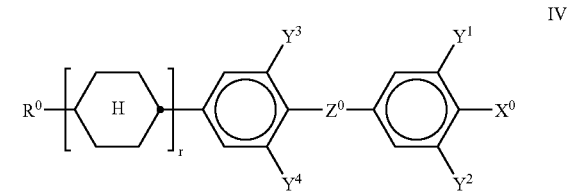

IV

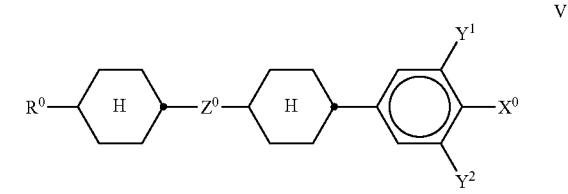

V

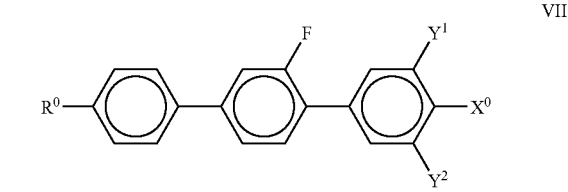

VII

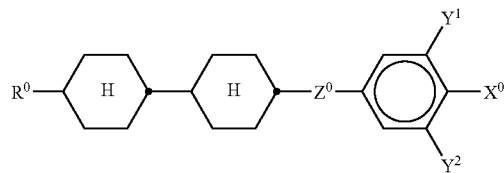  VIII

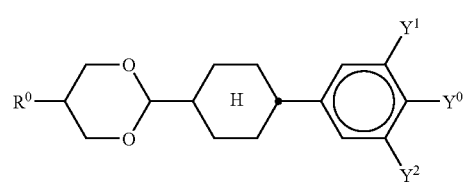  IX

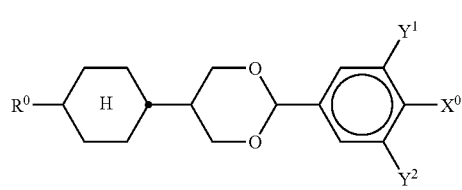  X in which the individual radicals have the following meanings:
R⁰ n-alkyl, alkoxy, oxaalkyl, fluoroalkyl, alkenyloxy or alkenyl having up to 12 carbon atoms
X⁰ F, Cl, halogenated alkyl, halogenated alkenyl, halogenated alkenyloxy or halogenated alkoxy, each having up to 8 carbon atoms,
Z⁰ —CH=CH—, —C₂H₄—, —CH₂O—, —OCH₂—, —(CH₂)₄—, —C₂F₄—, —CF=CF—, —C≡C—, —CH=CF—, —CF=CH—, —CF₂O—, —OCF₂— or —COO—,
Y¹, Y²,
Y³ and Y⁴ each, independently of one another, H or F, and
r 0 or 1 and the compounds II, III, V and VIII are not identical with the compounds of the formulae C1 to C9.

The compound of the formula IV is preferably

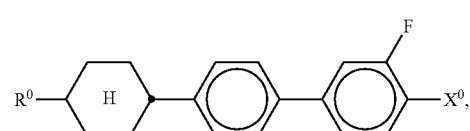

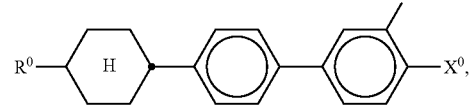

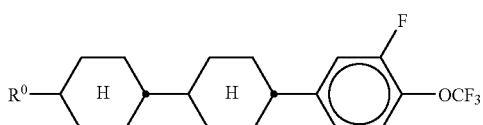

X⁰ in the said formulae is preferably halogen, in particular F or Cl, OCF₃ or OCHF₂.

The medium additionally comprises, in particular, one or more compounds of the formulae

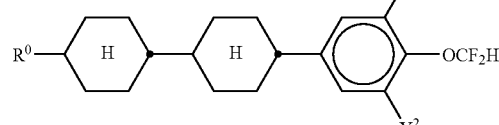

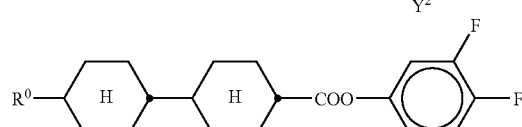

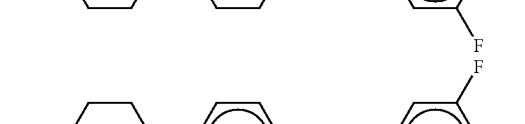

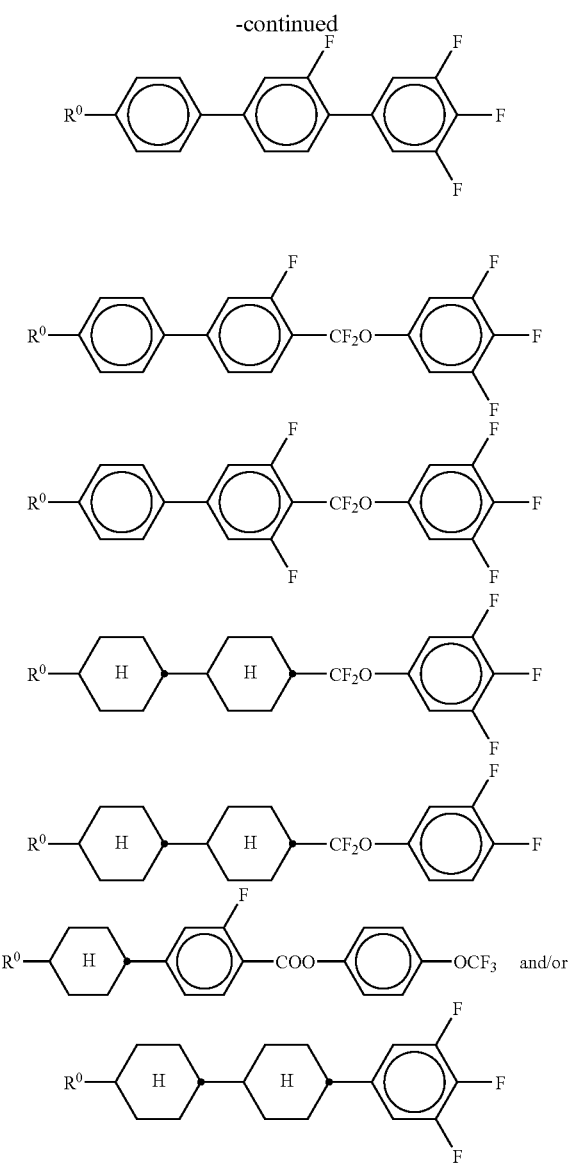
in which $R^0$ and $Y^2$ are as defined above.
The medium preferably comprises one, two or three, furthermore four, homologues of the compounds selected from the group consisting of H1 to H19 (n=1-12)
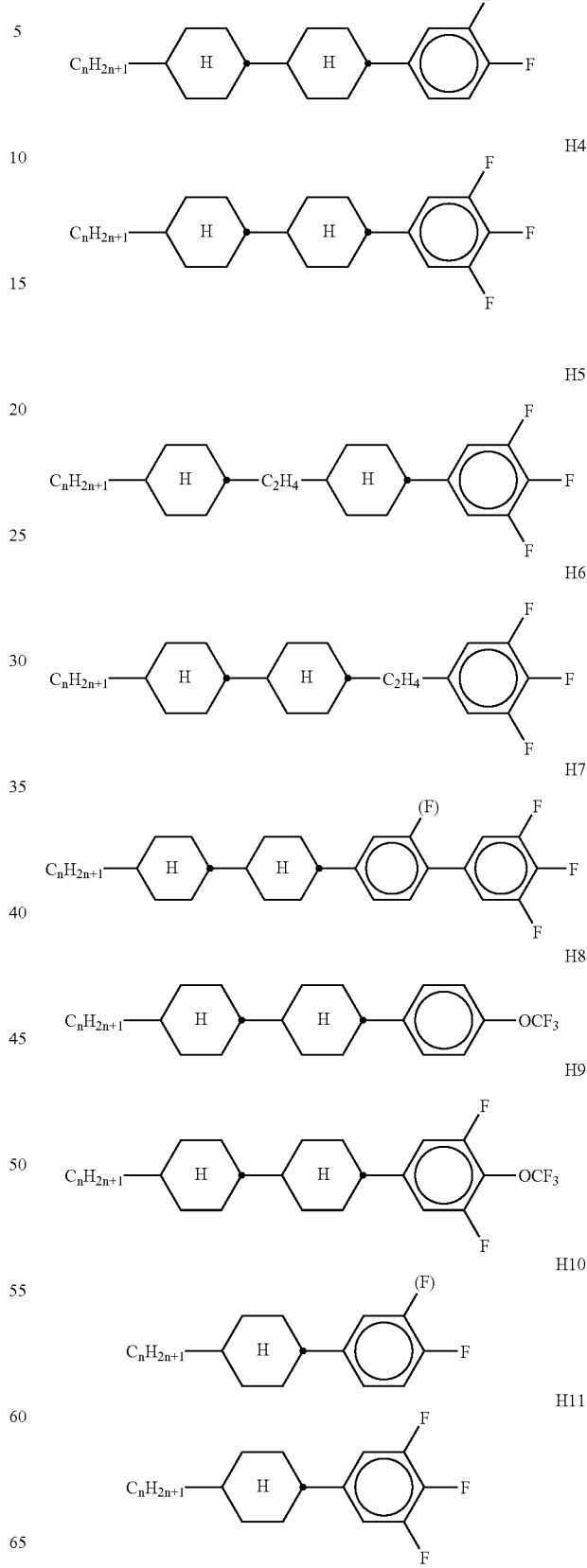

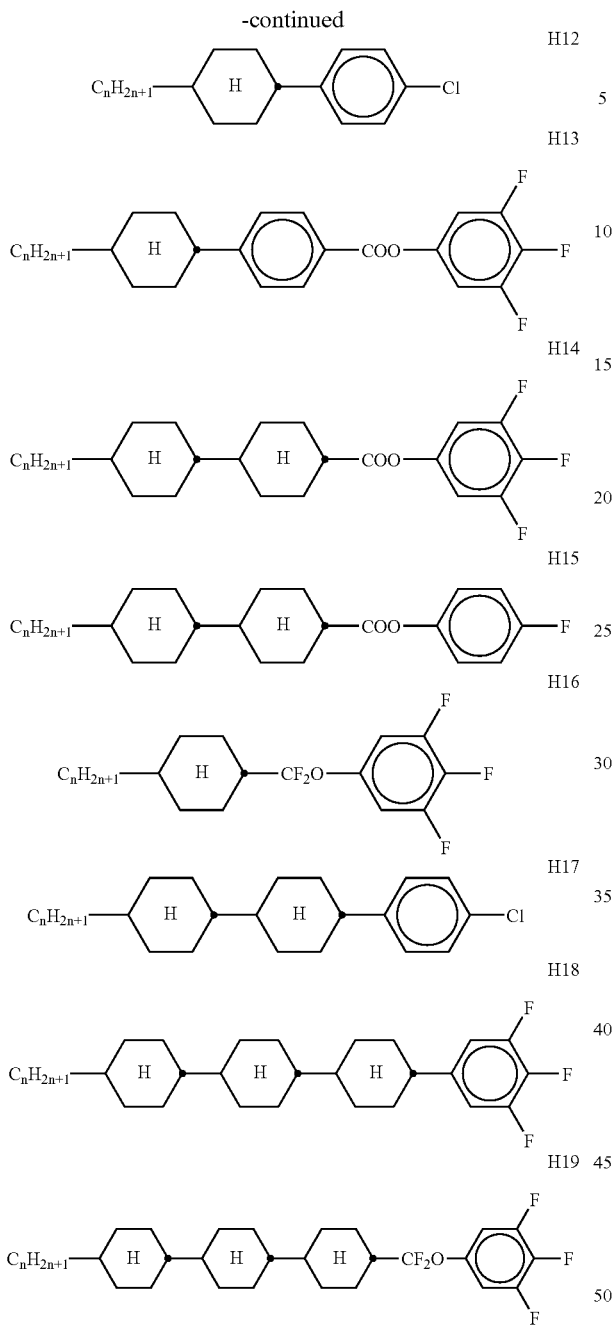

in which n is from 0 to 12, preferably from 0 to 7 and in particular from 1 to 5.

The medium additionally comprises one or more dioxanes of the formulae DI and/or DII

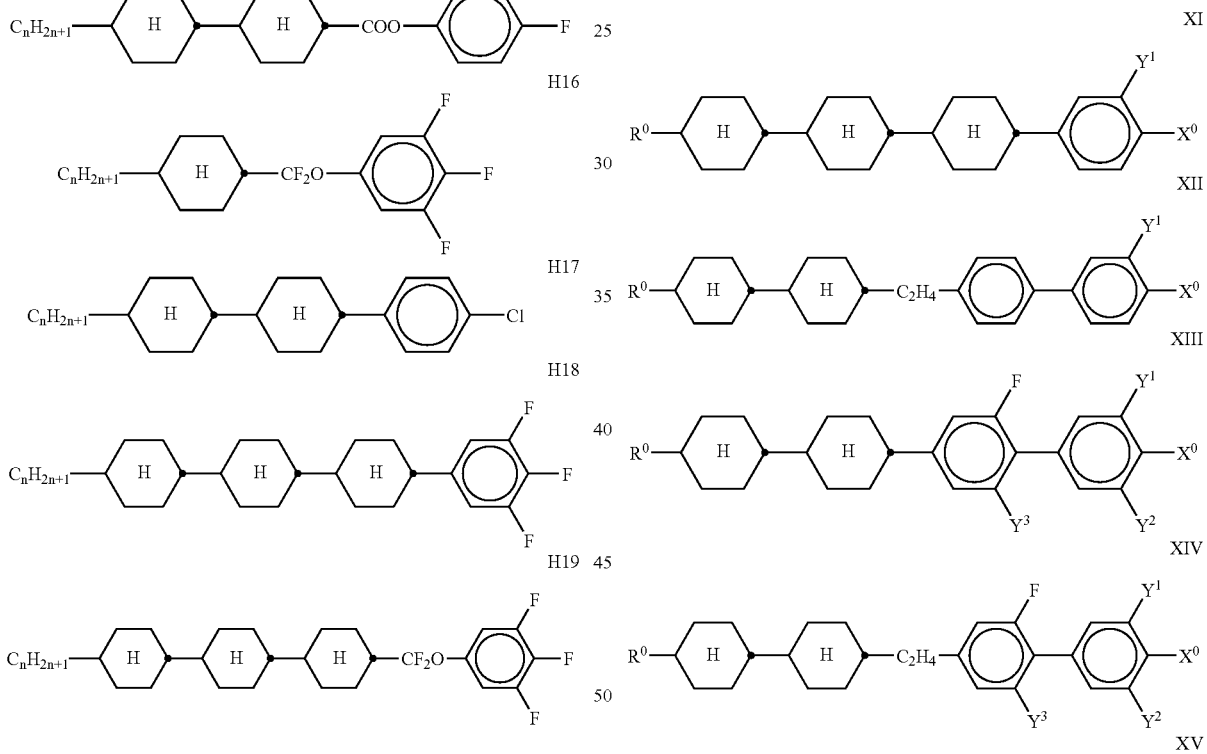

in which $R^0$ is as defined in Claim 4. $R^0$ in the compounds of the formulae DI and/or DII is preferably straight-chain alkyl or alkenyl having up to 8 carbon atoms. The compounds of the formulae DI and DII are particularly suitable for IPS mixtures. Preferred mixtures, in particular for IPS applications, comprise 2-35% by weight, in particular 2-30% by weight and very particularly preferably 2-25% by weight, of compounds of the formulae DI and/or DII.

The medium additionally comprises one or more compounds selected from the group consisting of the general formulae XI to XVI:

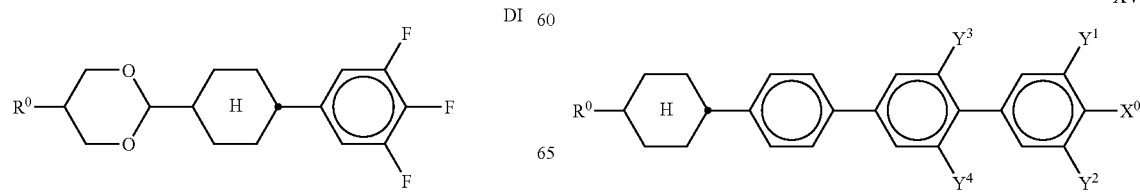

in which $R^0$, $X^0$, $Y^1$, $Y^2$, $Y^3$ and $Y^4$ are each, independently of one another, as defined in Claim 4. $X^0$ is preferably F, Cl, CF$_3$, OCF$_3$ or OCHF$_2$. $R^0$ is preferably alkyl, oxaalkyl, fluoroalkyl, alkenyl or alkenyloxy.

The proportion of compounds of the formulae I to X together in the mixture as a whole is at least 50% by weight.

The proportion of compounds of the formulae I and C1 to C9 in the mixture as a whole is from 5 to 50% by weight.

The proportion of compounds of the formulae C1 to C9 in the mixture as a whole is from 2 to 50% by weight, preferably from 5 to 40% by weight.

The proportion of compounds of the formulae II to X in the mixture as a whole is from 30 to 70% by weight.

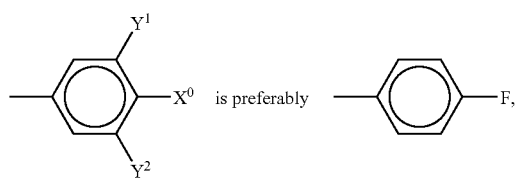

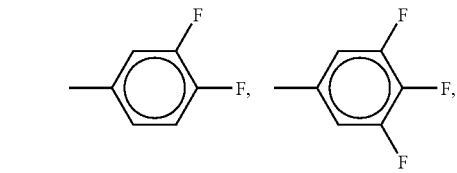

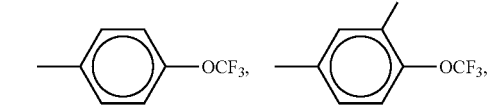

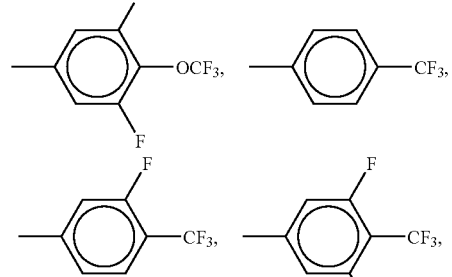

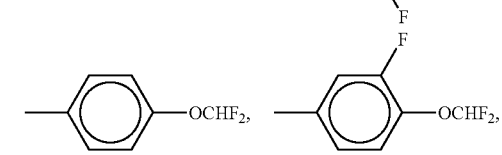

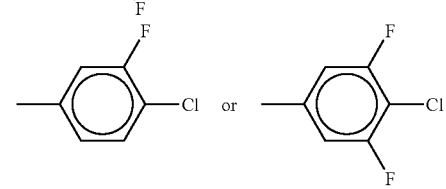

The medium comprises compounds of the formulae II, III, IV, V, VI, VII, VIII, IX and/or X.

$R^0$ is straight-chain alkyl or alkenyl having from 2 to 8 carbon atoms.

The medium essentially consists of compounds of the formulae I to XVI and C1 to C9.

The medium comprises further compounds, preferably selected from the following group consisting of the general formulae XVII to XX:

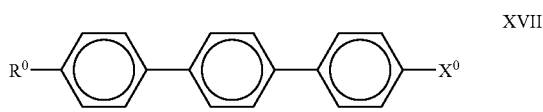

XVII

XVIII

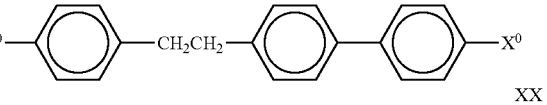

XIX

XX

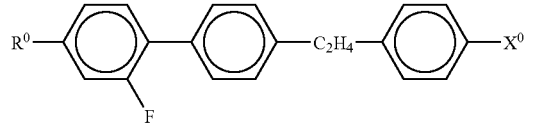

in which $R^0$, $Y^1$ and $X^0$ are as defined above. The 1,4-phenylene rings may additionally be substituted by CN, chlorine or fluorine.

The proportion of compounds of the formula C1 is preferably 2-20% by weight, in particular 5-18% by weight.

The proportion of the compounds of the formulae C2 and/or C3 in the mixture as a whole is preferably 5-30% by weight.

The proportion of the compounds of the formula C5 in the mixture as a whole is preferably 2-40% by weight, in particular 5-30% by weight.

In the compounds of the formulae C1 to C9, $X^1$ is preferably F, furthermore OCF$_3$ or Cl.

The 1,4-phenylene rings are preferably mono- or polysubstituted by fluorine atoms.

The medium comprises further compounds, preferably selected from the following group consisting of the formulae RI to RXVI

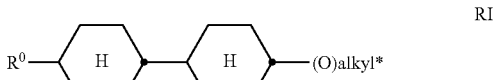

RI

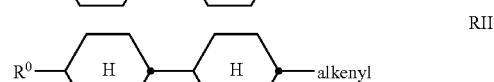

RII

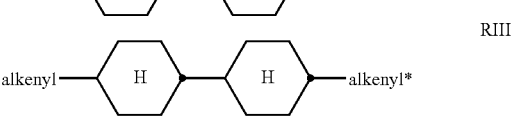

RIII

-continued

RIV: $R^0$—[Cy]—[Cy]—$(CF_2)_d CF_3$

RV: $R^0$—[Cy]—[Cy]—$OCF_3$

RVI: alkenyl—[Cy]—[Cy]—[Ph(F,F,Y$^1$)]

RVII: alkyl—[Cy]—[Cy]—$CH_2O$—[Cy]—alkyl*

RVIII: alkyl—[Cy]—[Cy]—[Ph]—alkyl*

RIX: alkyl—[Cy]—[Cy]—$CH_2O$—[Cy]—alkyl*

RX: alkyl—[Cy]—[Ph]—(O)alkyl*

RXI: alkyl—[Cy]—[Cy]—CH=CHF

RXII: alkyl—[Cy]—[Cy]—CH=CF$_2$

RXIII: alkyl—[Cy]—[Cy]—[Ph]—alkyl*

RXIV: alkyl—[Cy]—[Ph]—[Ph]—alkyl*

RXV: alkenyl—[Cy]—[Cy]—[Ph]—alkyl

RXVI: alkenyl—[Cy]—[Cy]—[Ph(F)]—alkyl in which
$R^0$ is n-alkyl, oxaalkyl, fluoroalkyl, alkenyloxy or alkenyl, each having from 1 to 12 carbon atoms,
d is 0, 1 or 2,
$Y^1$ is H or F,
alkyl and
alkyl* are each, independently of one another, a straight-chain or branched alkyl radical having from 2 to 8 carbon atoms,
alkenyl and
alkenyl* are each, independently of one another, a straight-chain or branched alkenyl radical having from 2 to 8 carbon atoms.

The proportion of compounds of the formulae RI to RXVI in the mixture as a whole is preferably from 2 to 50% by weight, in particular from 2 to 40% by weight.

The medium preferably comprises one or more compounds of the formulae

RIa: $C_nH_{2n+1}$—[Cy]—[Cy]—$C_mH_{2m+1}$

RIb: $C_nH_{2n+1}$—[Cy]—[Cy]—O—$C_mH_{2m+1}$

RIIa: $C_nH_{2n+1}$—[Cy]—[Cy]—CH=CH$_2$

RIIb: $C_nH_{2n+1}$—[Cy]—[Cy]—CH=CH—

RIIIa: CH$_2$=CH—[Cy]—[Cy]—CH=CH$_2$

RIIIb: CH$_2$=CH—[Cy]—[Cy]—CH=CH—

RIIIc: —CH=CH—[Cy]—[Cy]—CH=CH—

RIVa: $C_nH_{2n+1}$—[Cy]—[Cy]—$CF_3$ in which n and m are each an integer from 1 to 8.

The I:(II+III+IV+V+VI+VII+VII+IX+X) weight ratio is preferably from 1:10 to 10:1.

The medium essentially consists of compounds selected from the group consisting of the general formulae I to XVI and C1 to C9.

It has been found that even a relatively small proportion of compounds of the formula I mixed with C1 to C9 and conventional liquid-crystal materials, but in particular with one or more compounds of the formulae II, III, IV, V, VI, VII, VIII, IX and/or X results in a considerable lowering of the threshold voltage and in low birefringence values, with broad nematic phases with low smectic-nematic transition temperatures being observed at the same time, improving the storage stability. The compounds of the formulae I to X are colourless, stable and readily miscible with one another and with other liquid-crystal materials.

The term "alkyl" or "alkyl*" covers straight-chain and branched alkyl groups having from 2 to 8 carbon atoms, in particular the straight-chain groups ethyl, propyl, butyl, pentyl, hexyl and heptyl. Groups having 2-5 carbon atoms are generally preferred.

The term "alkenyl" or "alkenyl*" covers straight-chain and branched alkenyl groups having up to 8 carbon atoms, in particular the straight-chain groups. Particularly preferred alkenyl groups are $C_2$-$C_7$-1E-alkenyl, $C_4$-$C_7$-3E-alkenyl, $C_5$-$C_7$-4-alkenyl, $C_6$-$C_7$-5-alkenyl and $C_7$-6-alkenyl, in particular $C_2$-$C_7$-1E-alkenyl, $C_4$-$C_7$-3E-alkenyl and $C_5$-$C_7$-4-alkenyl. Examples of preferred alkenyl groups are vinyl, 1E-propenyl, 1E-butenyl, 1E-pentenyl, 1E-hexenyl, 1E-heptenyl, 3-butenyl, 3E-pentenyl, 3E-hexenyl, 3E-heptenyl, 4-pentenyl, 4Z-hexenyl, 4E-hexenyl, 4Z-heptenyl, 5-hexenyl, 6-heptenyl and the like. Groups having up to 5 carbon atoms are generally preferred.

The term "fluoroalkyl" preferably covers straight-chain groups having a terminal fluorine, i.e. fluoromethyl, 2-fluoroethyl, 3-fluoropropyl, 4-fluorobutyl, 5-fluoropentyl, 6-fluorohexyl and 7-fluoroheptyl. However, other positions of the fluorine are not excluded.

The term "oxaalkyl" preferably covers straight-chain radicals of the formula $C_nH_{2n+1}$—O—$(CH_2)_m$, in which n is from 1 to 6 and m is from 0 to 6. Preferably, n=1 and m is from 0 to 6.

Through a suitable choice of the meanings of $R^0$ and $X^0$, the addressing times, the threshold voltage, the steepness of the transmission characteristic lines, etc., can be modified in the desired manner. For example, 1E-alkenyl radicals, 3E-alkenyl radicals, 2E-alkenyloxy radicals and the like generally result in shorter addressing times, improved nematic tendencies and a higher ratio of the elastic constants $k_{33}$ (bend) and $k_{11}$ (splay) compared with alkyl or alkoxy radicals. 4-Alkenyl radicals, 3-alkenyl radicals and the like generally give lower threshold voltages and larger values of $k_{33}/k_{11}$ compared with alkyl and alkoxy radicals.

A —$CH_2CH_2$— group in $Z^1$ generally results in higher values of $k_{33}/k_{11}$ compared with a single covalent bond. Higher values of $k_{33}/k_{11}$ facilitate, for example, flatter transmission characteristic lines in TN cells with a 90° twist (in order to achieve grey shades) and steeper transmission characteristic lines in STN, SBE and OMI cells (greater multiplexability), and vice versa.

The optimum mixing ratio of the compounds of the formulae C1 to C9 and I+II+III+IV+V+VI+VII+VIII+IX+X depends substantially on the desired properties, on the choice of the components of the formulae I, II, III, IV, V, VI, VII, VIII, IX and/or X, and on the choice of any further components that may be present. Suitable mixing ratios within the range given above can easily be determined from case to case.

The total amount of compounds of the formulae C1 to C9 and I to XVI in the mixtures according to the invention is not crucial. The mixtures can therefore comprise one or more further components for the purposes of optimisation of various properties. However, the observed effect on the addressing times and the threshold voltage is generally greater, the higher the total concentration of compounds of the formulae C1 to C9 and I to XVI.

In a particularly preferred embodiment, the media according to the invention comprise compounds of the formulae II to X (preferably II and/or III) in which $X^0$ is $OCF_3$, $OCHF_2$, F, OCH=$CF_2$, OCF=$CF_2$, $OCF_2CHFCF_3$ or $OCF_2$—$CF_2H$. A favourable synergistic effect with the compounds of the formula I results in particularly advantageous properties.

The mixtures according to the invention having low optical anisotropy ($\Delta n<0.07$) are particularly suitable for reflective displays. Low $V_{th}$ mixtures are particularly suitable for 2.5 V drivers, 3.3 V drivers and 4 V or 5 V drivers. Ester-free mixtures are preferred for the latter applications. The mixtures according to the invention are furthermore suitable for IPS applications.

The construction of the MLC display according to the invention from polarisers, electrode base plates and surface-treated electrodes corresponds to the conventional construction for displays of this type. The term conventional construction is broadly drawn here and also covers all derivatives and modifications of the MLC display, in particular including matrix display elements based on poly-Si TFTs or MIM.

A significant difference between the displays according to the invention and the hitherto conventional displays based on the twisted nematic cell consists, however, in the choice of the liquid-crystal parameters of the liquid-crystal layer.

The liquid-crystal mixtures which can be used in accordance with the invention are prepared in a manner conventional per se. In general, the desired amount of the components used in lesser amount is dissolved in the components making up the principal constituent, advantageously at elevated temperature. It is also possible to mix solutions of the components in an organic solvent, for example in acetone, chloroform or methanol, and to remove the solvent again, for example by distillation, after thorough mixing.

The dielectrics may also comprise further additives known to the person skilled in the art and described in the literature. For example, 0-15%, preferably 0.1-10%, in particular 0.1-5%, of pleochroic dyes, UV stabilisers, antioxidants or chiral dopants can be added. Suitable stabilisers and dopants are listed in Tables C and D.

C denotes a crystalline phase, S a smectic phase, $S_c$ a smectic C phase, N a nematic phase and I the isotropic phase.

$V_{10}$ denotes the voltage for 10% transmission (viewing angle perpendicular to the plate surface). $t_{on}$ denotes the switch-on time and $t_{off}$ the switch-off time at an operating voltage corresponding to 2 times the value of $V_{10}$. $\Delta n$ denotes the optical anisotropy and $n_o$ the refractive index of the ordinary light beam. $\Delta Å$ denotes the dielectric anisotropy ($\Delta Å=Å_\|Å_\perp$, where $Å_\|$ denotes the dielectric constant parallel to the longitudinal molecular axes and $Å_\perp$ the dielectric constant perpendicular thereto). The electro-optical data were measured in a TN cell at the 1st minimum (i.e. at a d·$\Delta n$ value of 0.5 μm) at 20° C., unless expressly stated otherwise. The optical data were measured at 20° C., unless expressly stated otherwise.

In the present application and in the examples below, the structures of the liquid-crystal compounds are indicated by means of acronyms, the transformation into chemical formulae taking place in accordance with Tables A and B below. All radicals $C_nH_{2n+1}$ and $C_mH_{2m+1}$ are straight-chain alkyl radicals having n and m carbon atoms respectively. n and m are each, independently of one another, 1, 2, 3, 4, 5, 6, 7, 8, 9, 10, 11, 12, 13, 14 or 15. The coding in Table B is self-evident. In Table A, only the acronym for the parent structure is indicated. In individual cases, the acronym for the parent structure is followed, separated by a dash, by a code for the substituents $R^1$, $R^2$, $L^1$ and $L^2$:

| Code for $R^1$, $R^2$, $L^1$, $L^2$ | $R^1$ | $R^2$ | $L^1$ | $L^2$ |
|---|---|---|---|---|
| nm | $C_nH_{2n+1}$ | $C_mH_{2m+1}$ | H | H |
| nOm | $C_nH_{2n+1}$ | $OC_mH_{2m+1}$ | H | H |
| nO.m | $OC_nH_{2n+1}$ | $C_mH_{2m+1}$ | H | H |
| n | $C_nH_{2n+1}$ | CN | H | H |
| nN•F | $C_nH_{2n+1}$ | CN | H | F |
| nF | $C_nH_{2n+1}$ | F | H | H |
| nOF | $OC_nH_{2n+1}$ | F | H | H |
| nCl | $C_nH_{2n+1}$ | Cl | H | H |
| nF•F | $C_nH_{2n+1}$ | F | H | F |
| nF•F•F | $C_nH_{2n+1}$ | F | F | F |
| $nCF_3$ | $C_nH_{2n+1}$ | $CF_3$ | H | H |
| $nOCF_3$ | $C_nH_{2n+1}$ | $OCF_3$ | H | H |
| $nOCF_2$ | $C_nH_{2n+1}$ | $OCHF_2$ | H | H |
| nS | $C_nH_{2n+1}$ | NCS | H | H |
| rVsN | $C_rH_{2r+1}$—CH=CH—$C_sH_{2s}$— | CN | H | H |
| rEsN | $C_rH_{2r+1}$—O—$C_2H_{2s}$— | CN | H | H |
| nAm | $C_nH_{2n+1}$ | $COOC_mH_{2m+1}$ | H | H |
| $nOCCF_2$•F•F | $C_nH_{2n+1}$ | $OCH_2CF_2H$ | F | F |

Preferred mixture components are found in Tables A and B.

TABLE A

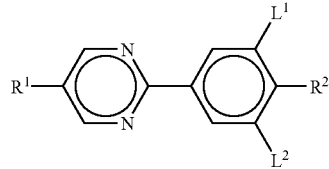

PYP

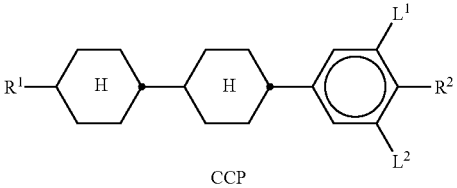

PYRP

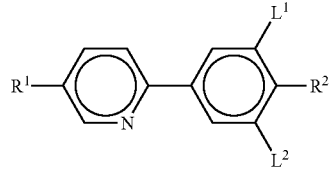

BCH

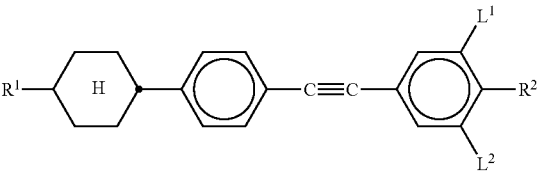

CBC

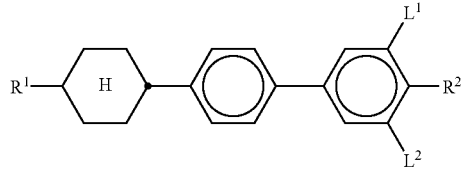

CCH

TABLE A-continued

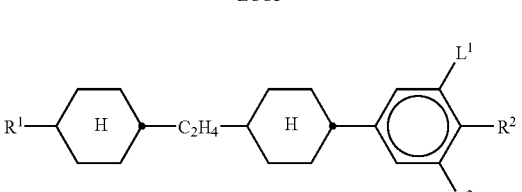

CCP

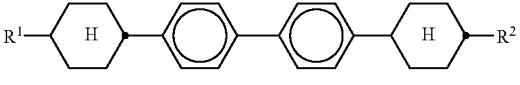

CPTP

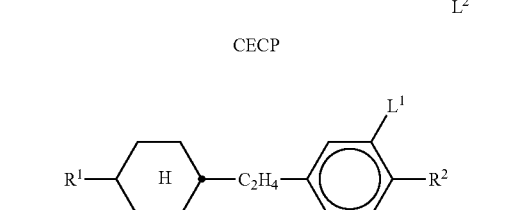

CEPTP

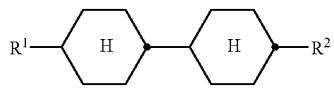

ECCP

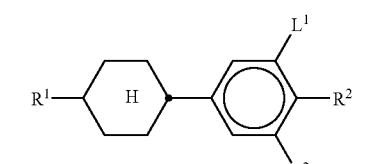

CECP

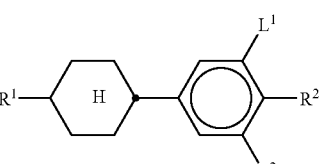

EPCH

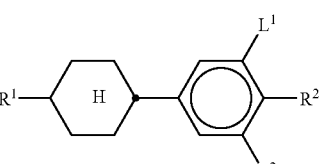

PCH

TABLE A-continued
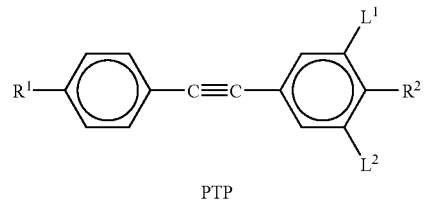
PTP
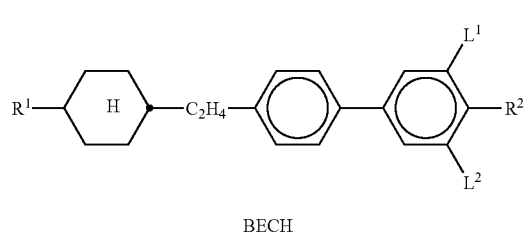
BECH
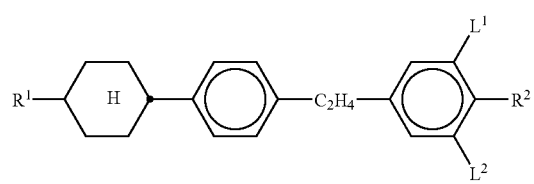
EBCH
CPC
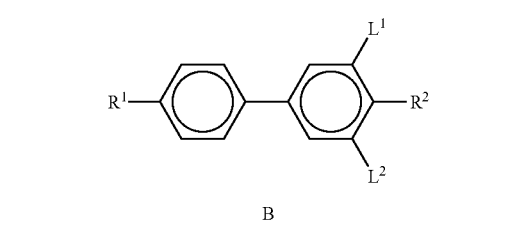
B
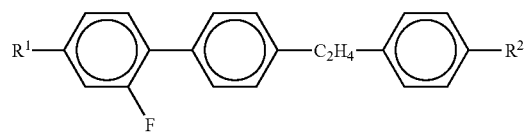
FET-nF
TABLE A-continued
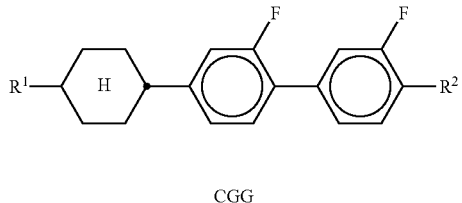
CGG
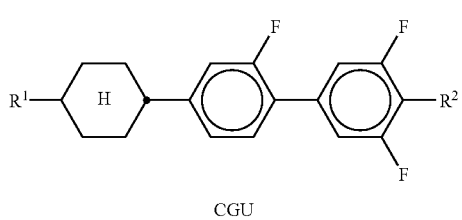
CGU
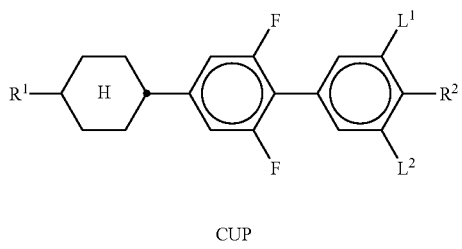
CUP
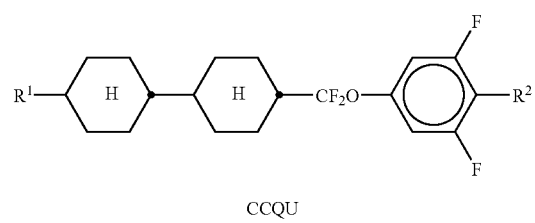
CCQU
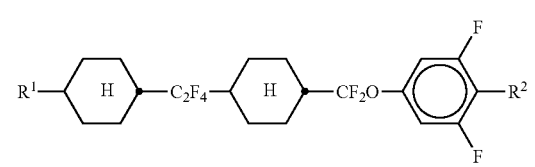
CWCQU
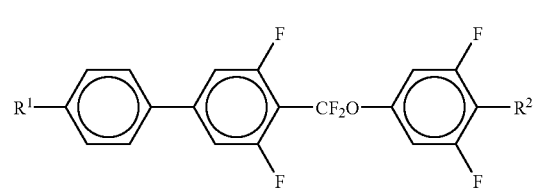
PUQU TABLE B
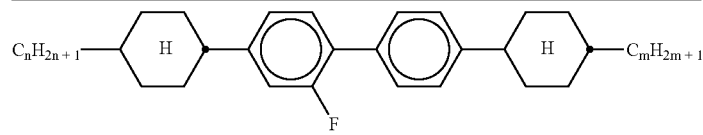
CBC-nmF
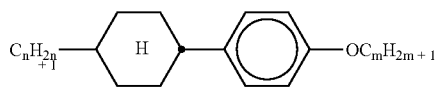
PCH-nOM
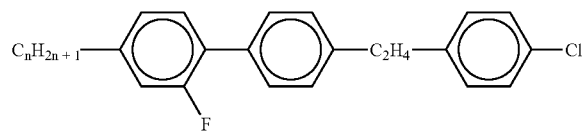
FET-nCl
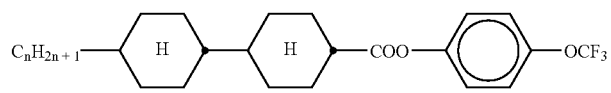
CP-nOCF₃
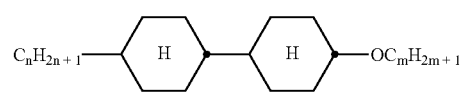
CCH-nOM
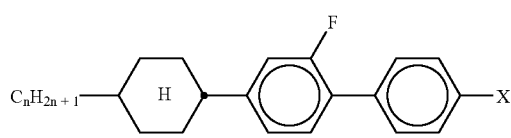
BCH-n.FX
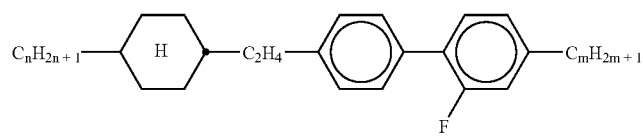
Inm
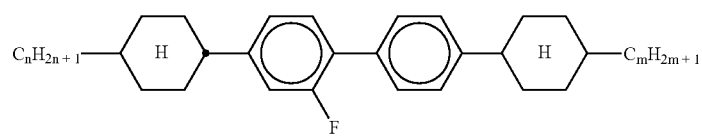
CBC-nmF TABLE B-continued
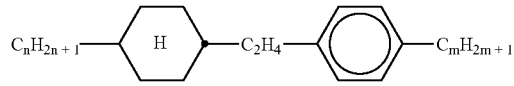
ECCP-nm
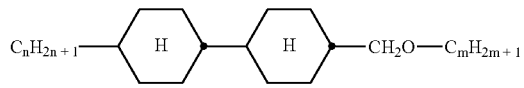
CCH-n1EM
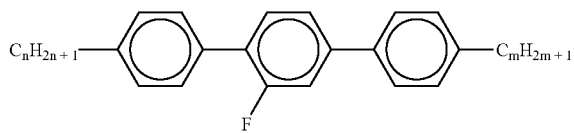
T-nFm
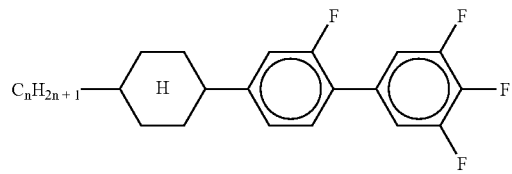
CGU-n-F
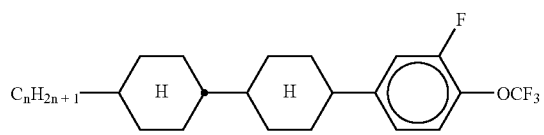
CCP-nOCF$_3$•F
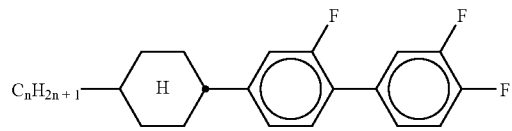
CGG-n-F
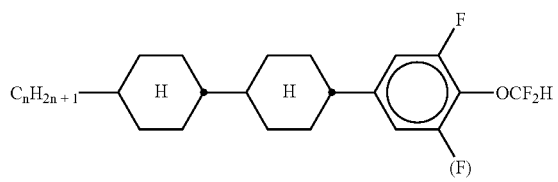
CCP-nOCF$_2$•F(•F)

TABLE B-continued
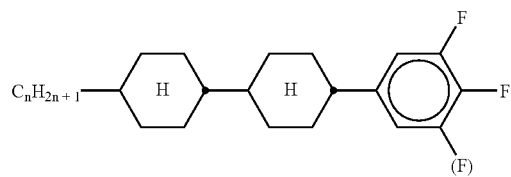
CCP-nF•F•F
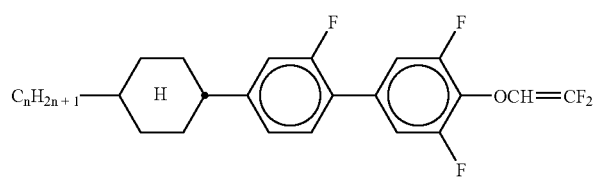
CGU-n-OXF
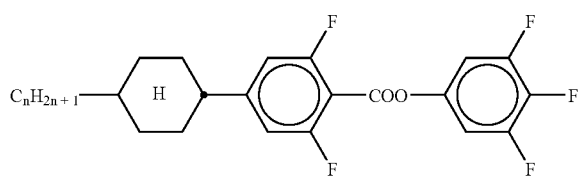
CUZU-n-F
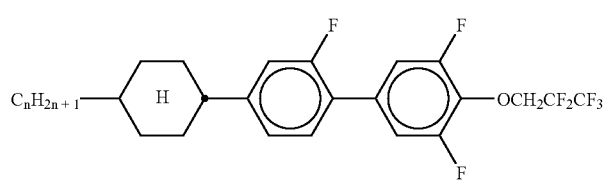
CGU-n-O1DT
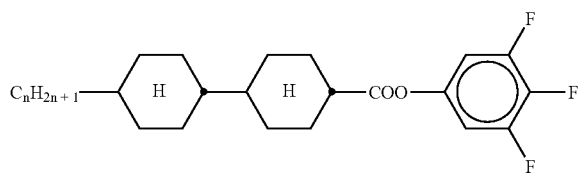
CCZU-n-F
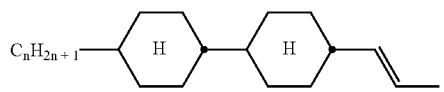
CC-n-V1
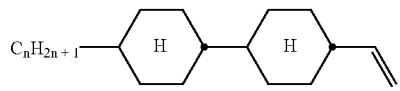
CC-n-V TABLE B-continued
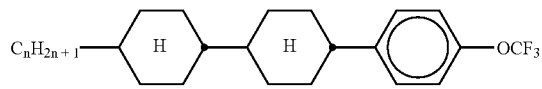
CCP-nOCF₃
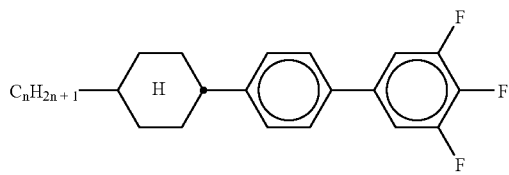
BCH-nF.F.F
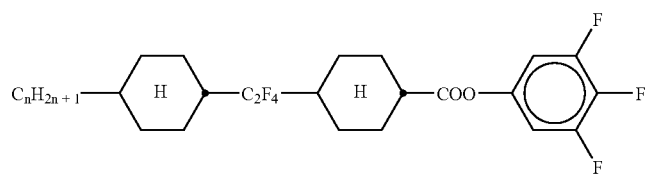
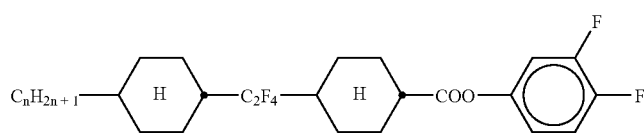
CWCZG-n-F
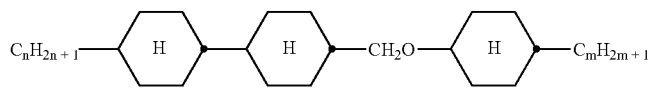
CCOC-n-m
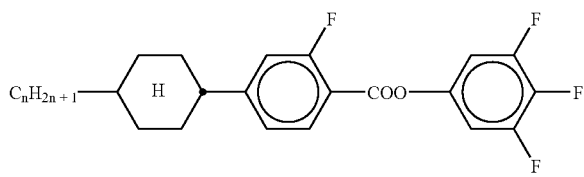
CGZU-n-F
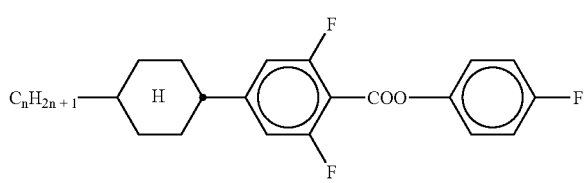
CUZP-n-F TABLE B-continued
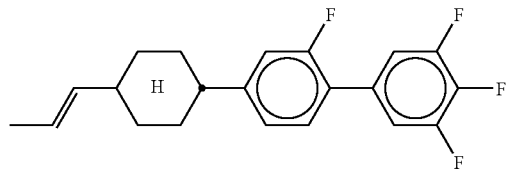
CGU-1V-F
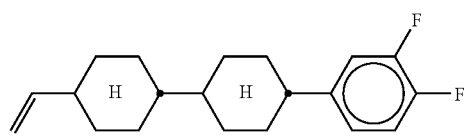
CCG-V-F
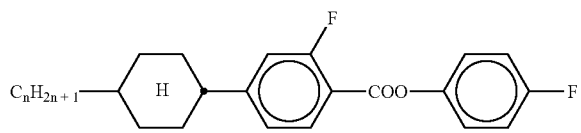
CGZP-n-F
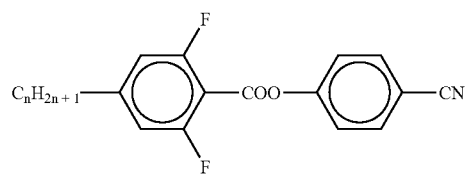
UZP-n-N
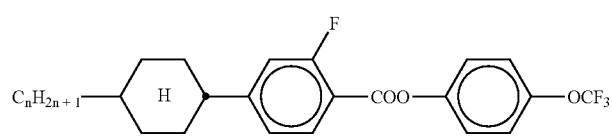
CGZP-n-OT
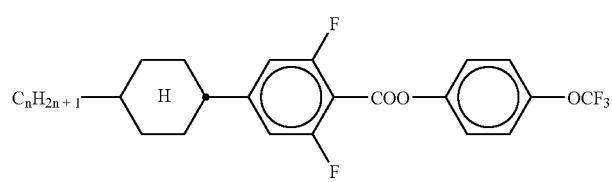
CUZP-n-OT TABLE B-continued
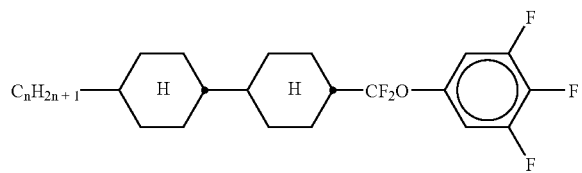
CCQU-n-F
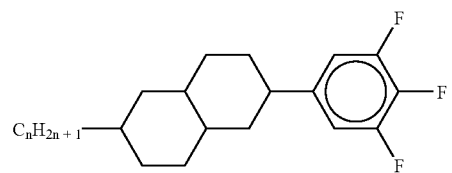
Deu-U-n-F
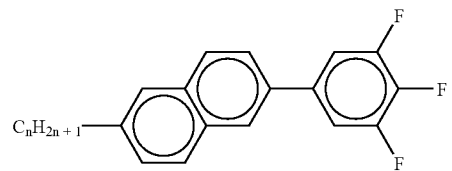
Nap-U-n-F
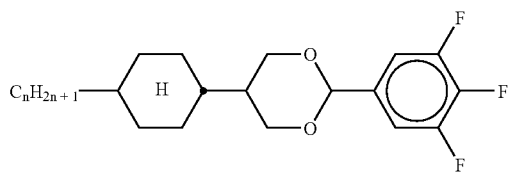
CDU-n-F
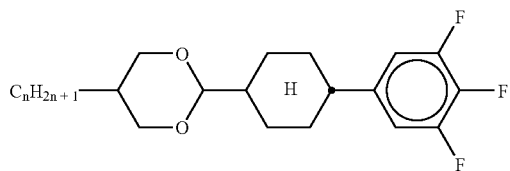
DCU-n-F
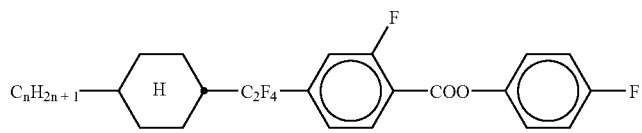
CWGZG-n-F TABLE B-continued
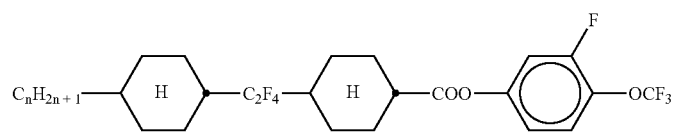
CWGZG-n-OT
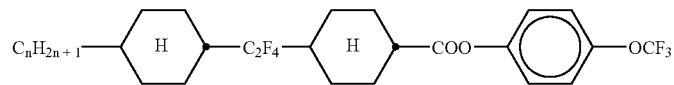
CWCZP-n-OT
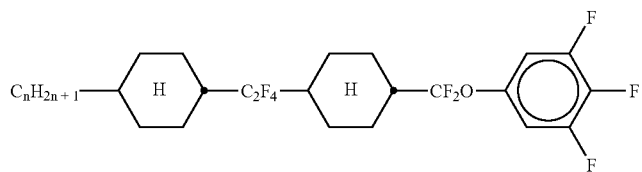
CWCQU-n-F
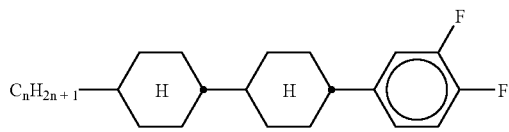
CCP-nF•F
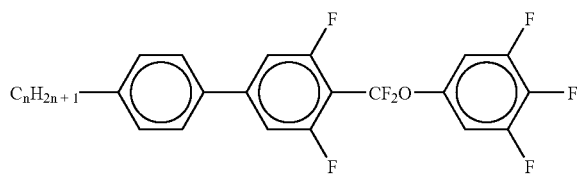
PUQU-n-F
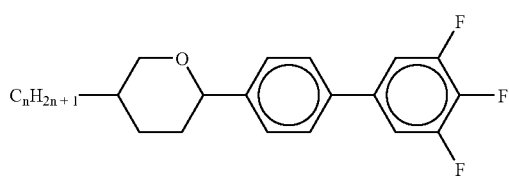
APU-n-F
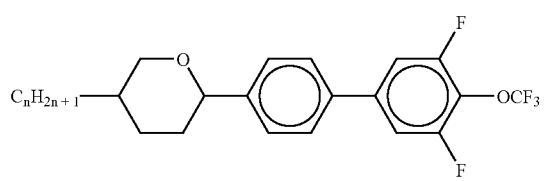
APU-n-OT TABLE B-continued
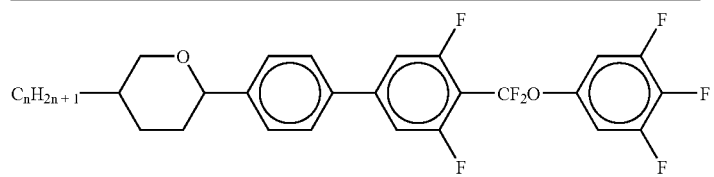
APUQU-n-F
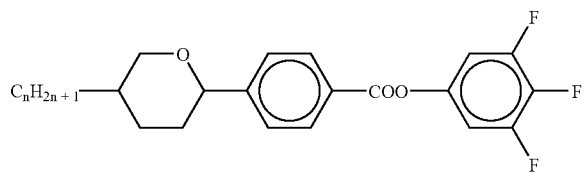
APZU-n-F
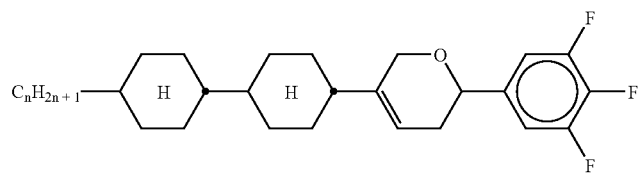
CCA*U-3-F
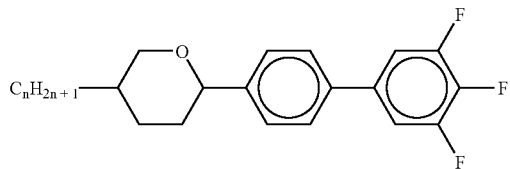
ACU-n-F
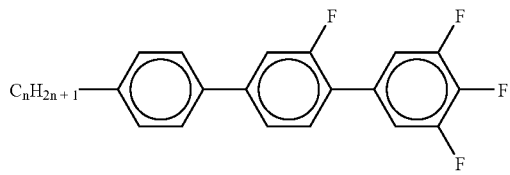
PGU-n-F
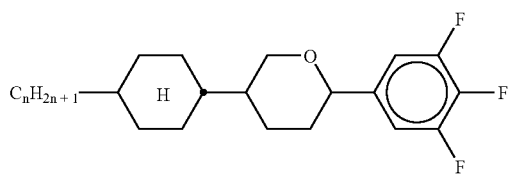
CAU-n-F TABLE B-continued
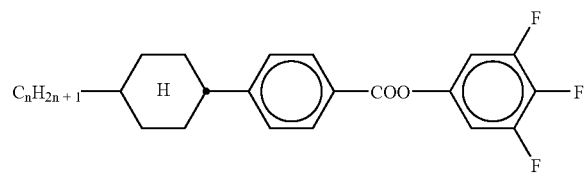
CPZU-n-F
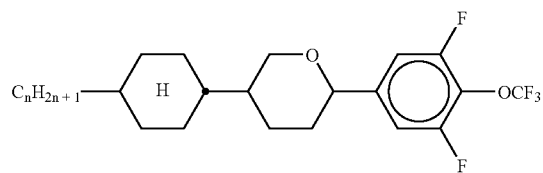
CAU-n-OT
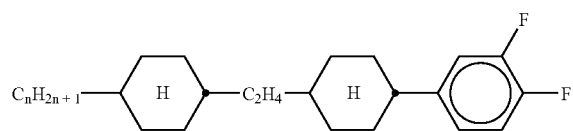
CECG-n-F
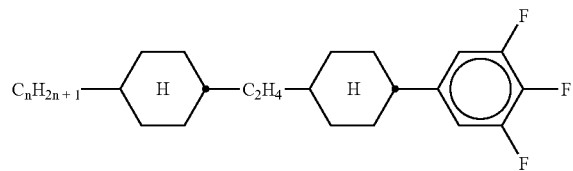
CECU-n-F
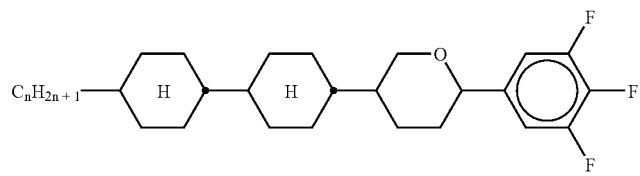
CCAU-n-F
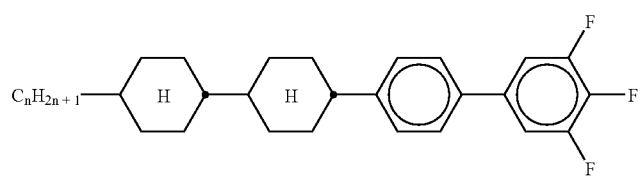
CCPU-n-F

TABLE C
Table C indicates possible dopants which are generally added to the mixtures according to the invention. The dopants are preferably added to the mixtures in amounts of from 0.1 to 5% by weight.
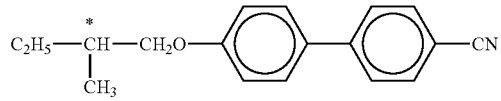
C 15
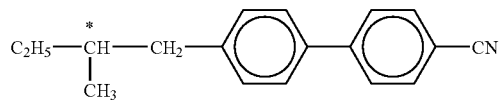
CB 15
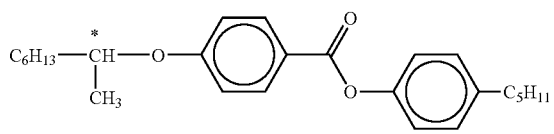
CM 21
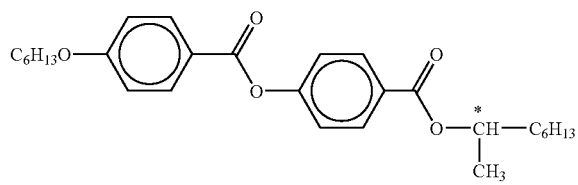
R/S-811
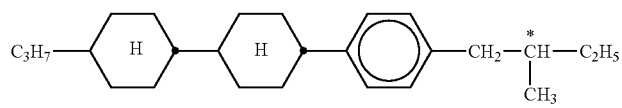
CM 44
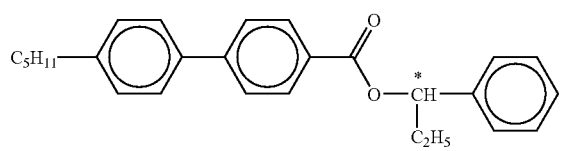
CM 45
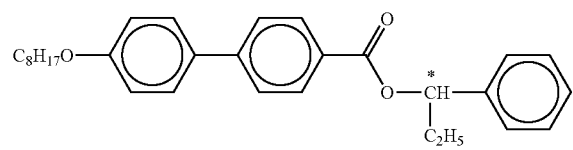
CM 47

TABLE C-continued
Table C indicates possible dopants which are generally added to the mixtures according to the invention. The dopants are preferably added to the mixtures in amounts of from 0.1 to 5% by weight.
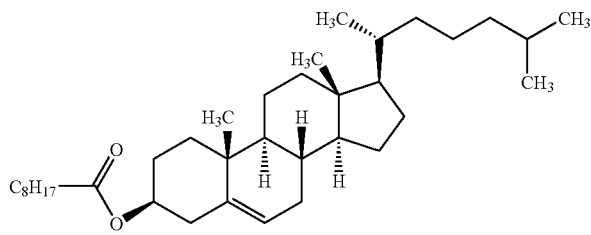
CN
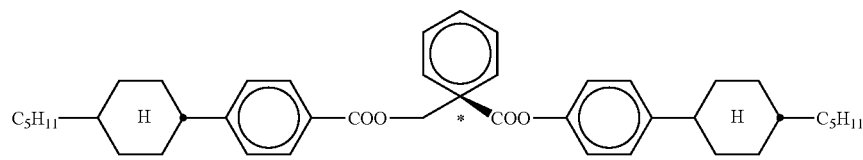
R/S-1011
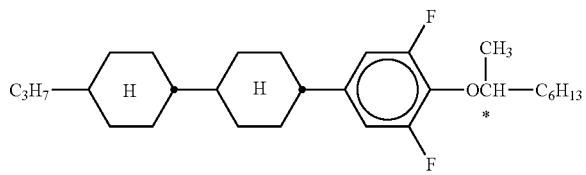
R/S-2011
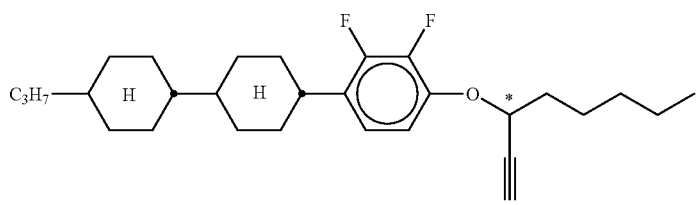
R/S-3011
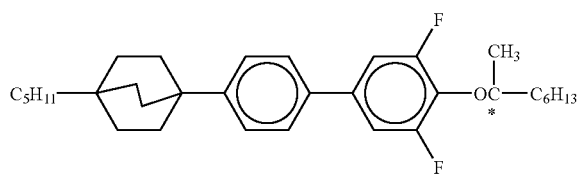
R/S-4011

TABLE C-continued

Table C indicates possible dopants which are generally added to the mixtures according to the invention. The dopants are preferably added to the mixtures in amounts of from 0.1 to 5% by weight.

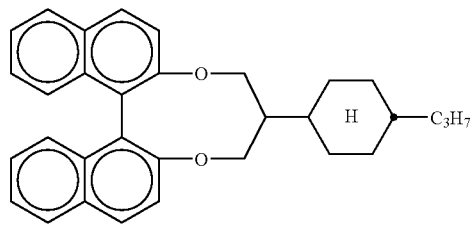

R/S-5011

TABLE D

Stabilisers (UV, antioxidants, free-radical scavengers) which can be added, for example, to the mixtures according to the invention are mentioned below.

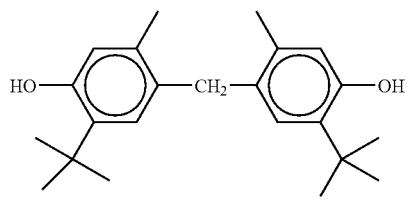

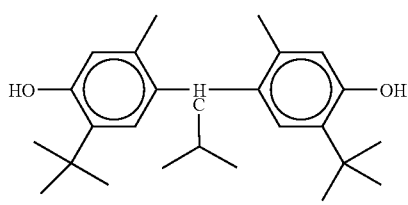

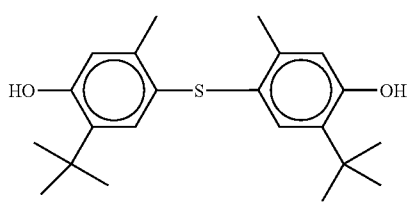

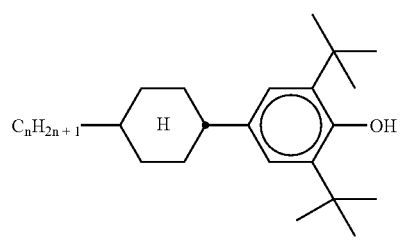

TABLE D-continued
Stabilisers (UV, antioxidants, free-radical scavengers) which can be added, for example, to the mixtures according to the invention are mentioned below.
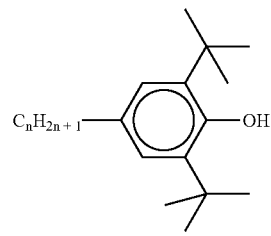
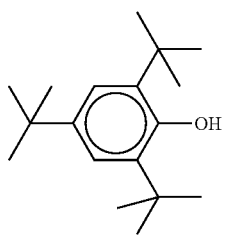
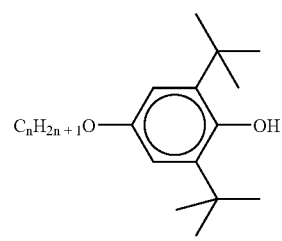
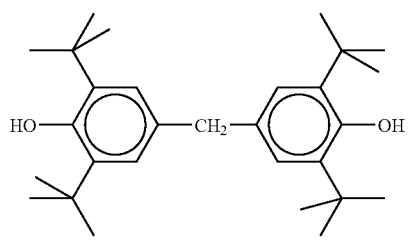
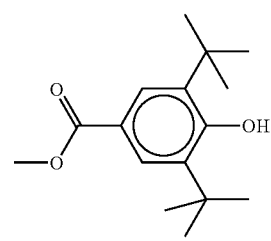
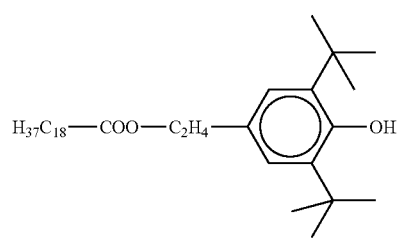

TABLE D-continued
Stabilisers (UV, antioxidants, free-radical scavengers) which can be added, for example, to the mixtures according to the invention are mentioned below.
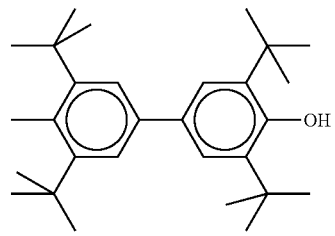
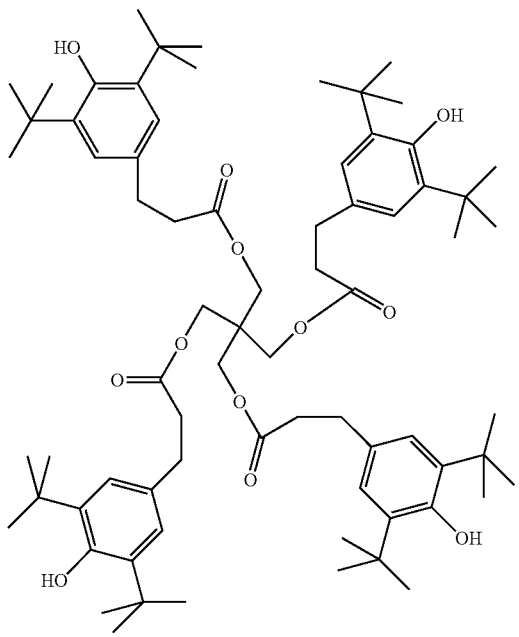
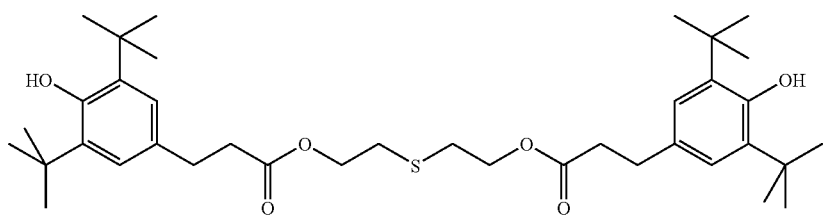
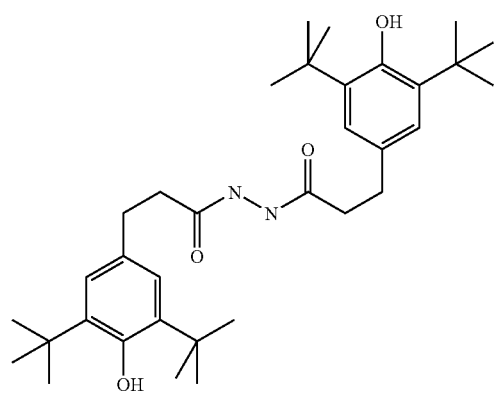

TABLE D-continued
Stabilisers (UV, antioxidants, free-radical scavengers) which can be added, for example, to the mixtures according to the invention are mentioned below.
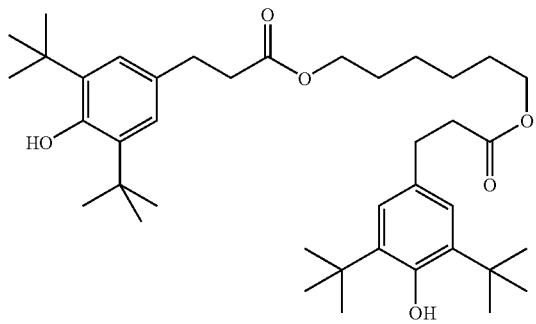
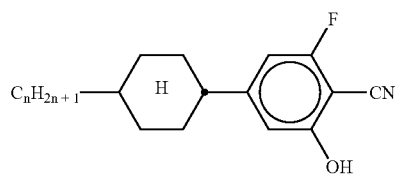
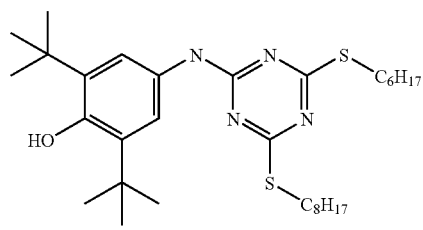
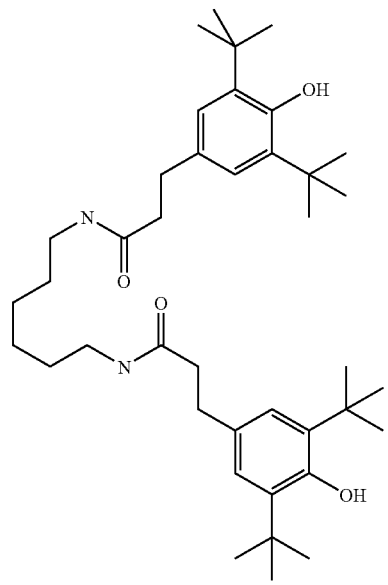

TABLE D-continued
Stabilisers (UV, antioxidants, free-radical scavengers) which can be added, for example, to the mixtures according to the invention are mentioned below.
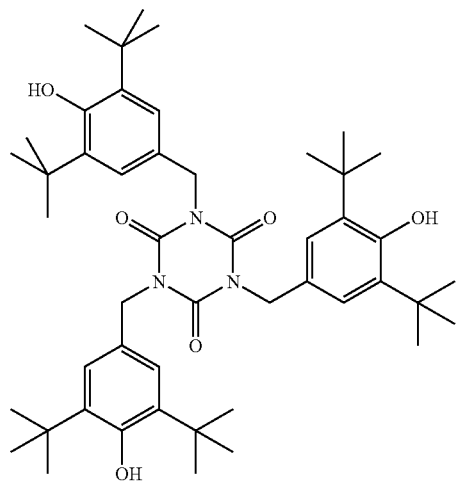
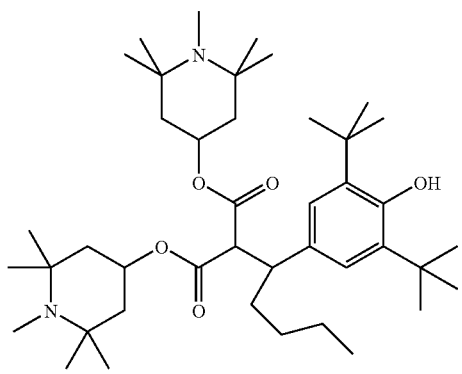
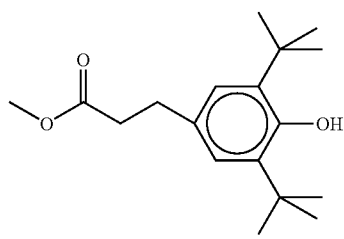
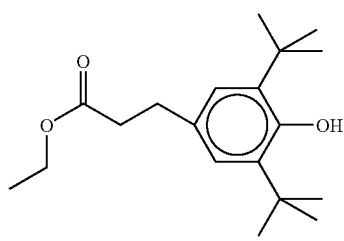

TABLE D-continued
Stabilisers (UV, antioxidants, free-radical scavengers) which can be added, for example, to the mixtures according to the invention are mentioned below.
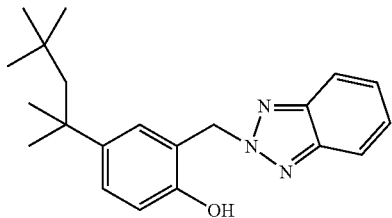
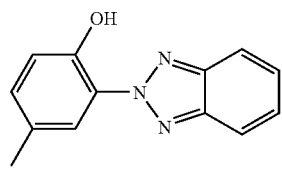
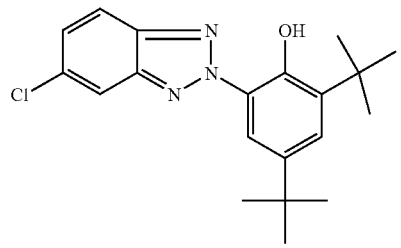
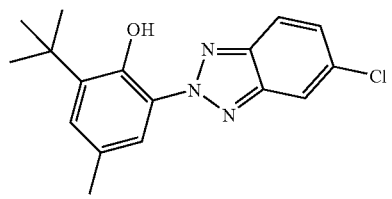
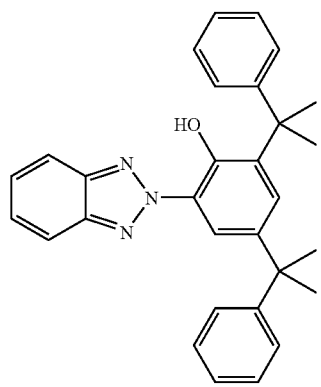

TABLE D-continued
Stabilisers (UV, antioxidants, free-radical scavengers) which can be added, for example, to the mixtures according to the invention are mentioned below.
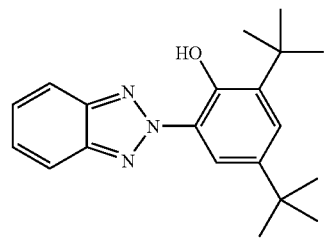
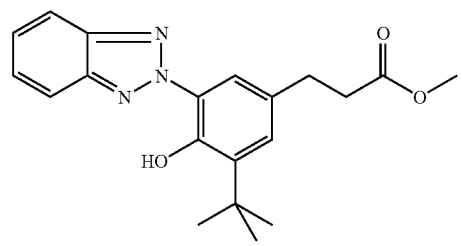
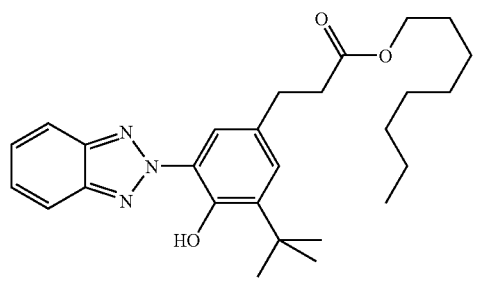
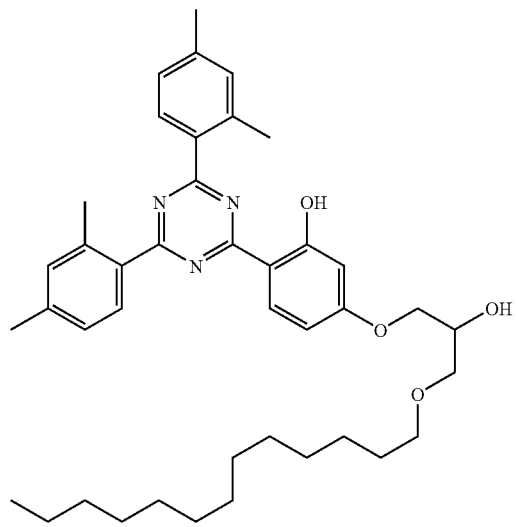

| TABLE D-continued |
|---|
| Stabilisers (UV, antioxidants, free-radical scavengers) which can be added, for example, to the mixtures according to the invention are mentioned below. |
| 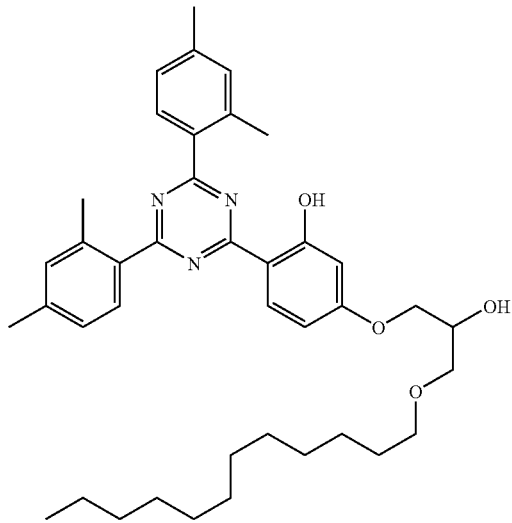 |
| 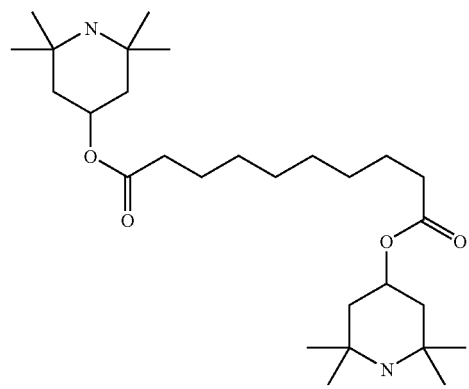 |
| 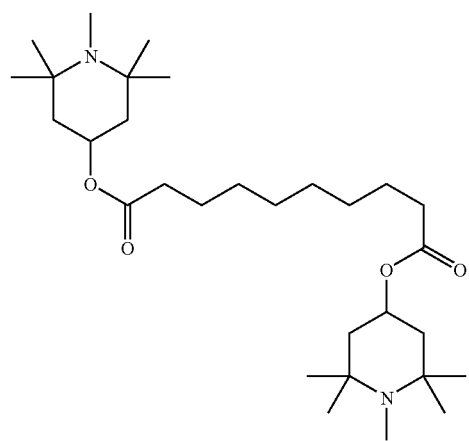 |

The following examples are intended to explain the invention without restricting it. Above and below, percentages are per cent by weight. All temperatures are given in degrees Celsius. m.p. denotes melting point, cl.p. clearing point. Furthermore, C=crystalline state, N=nematic phase, S=smectic phase and I=isotropic phase. The data between these symbols represent the transition temperatures. Δn denotes optical anisotropy (589 nm, 20° C.), ΔÅ denotes dielectric anisotropy (1 kHz, 20° C.). The flow viscosity $v_{20}$ (mm²/sec) was determined at 20° C. The rotational viscosity $\gamma_1$ (mPa·s) was likewise determined at 20° C.

MIXTURE EXAMPLES

Example M1

| | | | |
|---|---|---|---|
| CCP-2F•F | 10.00% | Clearing point [° C.]: | 78.5 |
| CCP-3F•F | 10.00% | Δn [589 nm, 20° C.]: | 0.0855 |
| CCZU-2-F | 3.50% | Δε [1 kHz, 20° C.]: | 9.9 |
| CCZU-3-F | 15.00% | $\gamma_1$ [mPa·s]: | 116 |
| CCZU-5-F | 2.00% | | |
| CCP-31 | 14.00% | | |
| CCH-25 | 4.00% | | |
| CCH-34 | 8.00% | | |
| PCH-3F•F•F | 7.00% | | |
| CPZU-2-F | 3.00% | | |
| CPZU-3-F | 2.50% | | |
| CPZU-5-F | 2.00% | | |
| APU-2-F | 9.00% | | |
| APU-3-F | 10.00% | | |

Example M2

| | | | |
|---|---|---|---|
| CCP-2F•F | 10.00% | Clearing point [° C.]: | 78.0 |
| CCP-3F•F | 10.00% | Δn [589 nm, 20° C.]: | 0.0860 |
| CCZU-2-F | 4.00% | Δε [1 kHz, 20° C.]: | 9.8 |
| CCZU-3-F | 15.00% | $\gamma_1$ [mPa·s]: | 110 |
| CCP-31 | 17.00% | | |
| CCH-25 | 4.00% | | |
| CCH-34 | 8.00% | | |
| PCH-3F•F•F | 7.00% | | |
| CPZU-2-F | 3.00% | | |
| CPZU-3-F | 3.00% | | |
| APU-2-F | 9.00% | | |
| APU-3-F | 5.00% | | |
| PUQU-3-F | 5.00% | | |

Example M3

| | | | |
|---|---|---|---|
| DCU-3-F | 2.00% | Clearing point [° C.]: | 74.5 |
| CCZU-2-F | 4.00% | Δn [589 nm, 20° C.]: | 0.0946 |
| CCZU-3-F | 15.00% | Δε [1 kHz, 20° C.]: | 12.6 |
| CCZU-5-F | 2.00% | $\gamma_1$ [mPa·s]: | 133 |
| CCP-31 | 11.00% | | |
| CCH-25 | 8.00% | | |
| CCH-34 | 8.00% | | |
| CPZU-2-F | 3.00% | | |
| CPZU-3-F | 3.00% | | |
| CPZU-5-F | 3.00% | | |
| CCP-3F•F | 8.00% | | |
| BCH-3F•F•F | 6.00% | | |
| APU-2-F | 9.00% | | |
| APU-3-F | 9.00% | | |
| PUQU-3-F | 9.00% | | |

Example M4

| | | | |
|---|---|---|---|
| CCH-34 | 9.00% | Clearing point [° C.]: | 80.0 |
| CCP-4F•F•F | 6.00% | Δn [589 nm, 20° C.]: | 0.065 |
| CECG-2-F | 5.00% | Δε [1 kHz, 20° C.]: | 9.4 |
| CECG-3-F | 6.00% | $\gamma_1$ [mPa·s]: | 175 |
| CECG-5-F | 11.00% | $V_{10}$ [V]: | 1.30 |
| CCZU-3-F | 15.00% | | |
| CCZU-4-F | 5.00% | | |
| CCZU-5-F | 5.00% | | |
| CAU-3-OT | 6.00% | | |
| CAU-3-F | 9.00% | | |
| ACU-3-F | 7.00% | | |
| ACQU-3-F | 10.00% | | |
| ACU-2-F | 6.00% | | |

Example M5

| | | | |
|---|---|---|---|
| CCH-34 | 9.00% | Clearing point [° C.]: | 79.0 |
| CCH-32 | 15.00% | Δn [589 nm, 20° C.]: | 0.061 |
| CCP-2F•F | 11.00% | Δε [1 kHz, 20° C.]: | 6.2 |
| CECG-2-F | 11.00% | $\gamma_1$ [mPa·s]: | 123 |
| CECG-3-F | 5.00% | | |
| CECG-5-F | 11.00% | | |
| CCZU-3-F | 15.00% | | |
| CCZU-4-F | 7.50% | | |
| CCZU-5-F | 5.00% | | |
| ACQU-3-F | 10.00% | | |
| ACU-2-F | 0.50% | | |

Example M6

| | | | |
|---|---|---|---|
| CCH-34 | 5.00% | Clearing point [° C.]: | 80.0 |
| CPZU-2-F | 4.00% | Δn [589 nm, 20° C.]: | 0.110 |
| CPZU-3-F | 5.00% | Δε [1 kHz, 20° C.]: | 12.1 |
| CPZU-5-F | 3.00% | $\gamma_1$ [mPa·s]: | 182 |
| CECG-3-F | 5.00% | | |
| CECG-5-F | 6.00% | | |
| CCP-4F•F | 15.00% | | |
| BCH-3F•F•F | 20.00% | | |
| BCH-5F•F•F | 20.00% | | |
| CCZU-5-F | 3.00% | | |
| APUQU-3-F | 10.00% | | |
| APU-3-F | 4.00% | | |

Example M7

| | | | |
|---|---|---|---|
| CCP-3F•F | 15.00% | Clearing point [° C.]: | 80.0 |
| CCP-4F•F | 7.00% | Δn [589 nm, 20° C.]: | 0.102 |
| CCZU-3-F | 15.00% | Δε [1 kHz, 20° C.]: | 14.6 |
| CCZU-4-F | 3.00% | $\gamma_1$ [mPa·s]: | 198 |
| CCZU-5-F | 3.00% | | |

-continued

| | |
|---|---|
| CPZU-2-F | 4.00% |
| CPZU-3-F | 5.00% |
| CPZU-5-F | 3.00% |
| PUQU-3-F | 10.00% |
| CAU-3-OT | 10.00% |
| APUQU-3-F | 10.00% |
| APU-3-F | 7.00% |
| APU-3-OT | 8.00% |

Example M8

| | | | |
|---|---|---|---|
| CCP-3F•F | 4.00% | S → N: | <−40° C. |
| CCZU-3-F | 15.00% | Clearing point [° C.]: | 80.0 |
| CCZU-4-F | 3.00% | Δn [589 nm, 20° C.]: | 0.093 |
| CCZU-5-F | 3.00% | Δε [1 kHz, 20° C.]: | 15.8 |
| CPZU-2-F | 4.00% | $\gamma_1$ [mPa·s]: | 236 |
| CPZU-3-F | 5.00% | | |
| CPZU-5-F | 3.00% | | |
| DCU-3-F | 4.00% | | |
| DCU-4-F | 7.00% | | |
| DCU-5-F | 17.00% | | |
| CCPU-2-F | 4.00% | | |
| CCPU-3-F | 3.00% | | |
| CAU-3-OT | 10.00% | | |
| APUQU-3-F | 10.00% | | |
| APU-3-OT | 8.00% | | |

Example M9

| | | | |
|---|---|---|---|
| CCH-34 | 9.00% | Clearing point [° C.]: | 78.5 |
| CCH-32 | 15.00% | Δn [589 nm, 20° C.]: | 0.079 |
| PCH-3Cl | 2.00% | Δε [1 kHz, 20° C.]: | 9.2 |
| PCH-5Cl | 2.00% | $\gamma_1$ [mPa·s]: | 120 |
| CCP-3Cl | 10.00% | $V_{10}$ [V]: | 1.34 |
| CPZU-3-F | 5.00% | | |
| CCZU-3-F | 15.00% | | |
| CECU-3-F | 10.00% | | |
| CECG-5-F | 2.00% | | |
| APUQU-3-F | 10.00% | | |
| CAU-3-F | 10.00% | | |
| ACQU-3-F | 10.00% | | |

Example M10

| | | | |
|---|---|---|---|
| CCH-34 | 9.00% | S → N: | < −40° C. |
| CCH-32 | 15.00% | Clearing point [° C.]: | 80.0 |
| CPZU-3-F | 5.00% | Δn [589 nm, 20° C.]: | 0.079 |
| CPZU-5-F | 0.50% | Δε [1 kHz, 20° C.]: | 9.3 |
| CCP-2F•F | 15.00% | $\gamma_1$ [mPa·s]: | 110 |
| CCP-3F•F | 15.00% | $V_{10}$ [V]: | 1.28 |
| CCZU-3-F | 15.00% | | |
| CCZU-4-F | 5.00% | | |
| CCZU-5-F | 5.00% | | |
| PUQU-3-F | 5.50% | | |
| APUQU-2-F | 10.00% | | |

Example M11

| | | | |
|---|---|---|---|
| PCH-7F | 6.00% | Clearing point [° C.]: | 81.0 |
| CCP-2F•F | 17.00% | Δn [589 nm, 20° C.]: | 0.102 |
| CCP-3F•F | 17.00% | Δε [1 kHz, 20° C.]: | 9.6 |
| CCP-4F•F | 16.00% | $\gamma_1$ [mPa·s]: | 150 |
| BCH-2F•F | 7.00% | $V_{10}$ [V]: | 1.30 |
| BCH-3F•F | 7.00% | | |
| APUQU-2-F | 10.00% | | |
| APU-2-F | 6.00% | | |
| APU-3-F | 12.00% | | |
| BCH-33 | 2.00% | | |

Example M12

| | | | |
|---|---|---|---|
| PCH-7F | 9.00 | Clearing point [° C.]: | 80.0 |
| CCP-2F•F | 17.00% | Δn [589 nm, 20° C.]: | 0.090 |
| CCP-3F•F | 17.00% | Δε [1 kHz, 20° C.]: | 8.8 |
| CCP-4F•F | 17.00% | $\gamma_1$ [mPa·s]: | 150 |
| BCH-2F•F | 6.00% | $V_{10}$ [V]: | 1.40 |
| BCH-3F•F | 2.00% | | |
| CCOC-3-3 | 3.00% | | |
| CCOC-4-3 | 1.00% | | |
| APUQU-2-F | 10.00% | | |
| ACQU-3-F | 6.00% | | |
| APU-2-F | 9.50% | | |
| BCH-32 | 1.50% | | |
| CCP-32 | 1.00% | | |

Example M13

| | | | |
|---|---|---|---|
| PCH-7F | 4.00% | Clearing point [° C.]: | 80.0 |
| CCP-2F•F | 8.00% | Δn [589 nm, 20° C.]: | 0.115 |
| CCP-3F•F | 7.00% | Δε [1 kHz, 20° C.]: | 11.3 |
| CCP-4F•F | 7.00% | $\gamma_1$ [mPa·s]: | 170 |
| CCP-5F•F | 7.00% | $V_{10}$ [V]: | 1.15 |
| BCH-2F•F | 7.00% | | |
| BCH-3F•F | 7.00% | | |
| BCH-5F•F | 7.00% | | |
| APU-3-F | 10.00% | | |
| APUQU-2-F | 8.00% | | |
| APU-2-F | 10.00% | | |
| APU-3-OT | 7.00% | | |
| APZU-2-F | 5.00% | | |
| BCH-32 | 3.00% | | |
| BCH-33 | 3.00% | | |

Example M14

| | | | |
|---|---|---|---|
| BCH-2F•F | 8.00% | Clearing point [° C.]: | 80.5 |
| BCH-3F•F | 8.00% | Δn [589 nm, 20° C.]: | 0.118 |
| BCH-4F•F | 8.00% | Δε [1 kHz, 20° C.]: | 9.5 |
| BCH-5F•F | 8.00% | $\gamma_1$ [mPa·s]: | 140 |
| CCP-2F•F | 10.00% | | |
| CCP-3F•F | 10.00% | | |
| PCH-7F | 5.00% | | |
| APUQU-2-F | 6.00% | | |
| APU-2-F | 5.00% | | |
| APU-3-F | 9.00% | | |
| APZU-2-F | 5.00% | | |

-continued

| | |
|---|---|
| BCH-32 | 3.00% |
| CBC-33 | 3.00% |
| CBC-53 | 2.00% |
| PCH-3Cl | 10.00% |

Example M15 (IPS)

| | | | |
|---|---|---|---|
| CCP-2F•F | 10.50% | Clearing point [° C.]: | 81.5 |
| CCP-3F•F | 10.00% | Δn [589 nm, 20° C.]: | 0.0852 |
| CCP-5F•F | 4.00% | Δε [1 kHz, 20° C.]: | 10.1 |
| CDU-2-F | 9.00% | γ₁ [mPa·s]: | 117 |
| CDU-3-F | 3.50% | | |
| CCZU-2-F | 4.00% | | |
| CCZU-3-F | 15.00% | | |
| CCZU-5-F | 2.00% | | |
| BCH-32 | 7.00% | | |
| CCH-35 | 6.00% | | |
| CCH-34 | 6.00% | | |
| CCH-501 | 5.00% | | |
| APU-2-F | 9.00% | | |
| APU-3-F | 9.00% | | |

Example M16 (IPS)

| | | | |
|---|---|---|---|
| CCP-2F•F | 10.00% | Clearing point [° C.]: | 81.5 |
| CCP-3F•F | 10.00% | Δn [589 nm, 20° C.]: | 0.0855 |
| CCP-5F•F | 4.00% | Δε [1 kHz, 20° C.]: | 10.1 |
| CCZU-2-F | 4.00% | γ₁ [mPa·s]: | 120 |
| CCZU-3-F | 15.00% | | |
| CCZU-5-F | 4.00% | | |
| BCH-32 | 8.00% | | |
| CCH-35 | 6.00% | | |
| CCH-34 | 5.00% | | |
| CCH-501 | 3.00% | | |
| APU-2-F | 8.00% | | |
| APU-3-F | 7.00% | | |
| ACU-2-F | 9.00% | | |
| ACU-3-F | 7.00% | | |

Example M17

| | | | |
|---|---|---|---|
| CCP-2F•F | 10.00% | Clearing point [° C.]: | 80.5 |
| CCP-3F•F | 10.00% | Δn [589 nm, 20° C.]: | 0.0859 |
| CCP-5F•F | 10.00% | Δε [1 kHz, 20° C.]: | 10.0 |
| BCH-32 | 7.00% | γ₁ [mPa·s]: | 122 |
| CCH-35 | 7.00% | | |
| CCH-34 | 7.00% | | |
| APU-2-F | 8.00% | | |
| APU-3-F | 6.00% | | |
| ACU-3-F | 11.00% | | |
| CAU-3-F | 10.00% | | |
| ACQU-3-F | 13.00% | | |
| CBC-33 | 1.00% | | |

Example M18

| | | | |
|---|---|---|---|
| CC-3-V1 | 9.00% | Clearing point [° C.]: | 80.0 |
| CC-5-V | 15.00% | Δn [589 nm, 20° C.]: | 0.089 |
| CCH-35 | 5.00% | Δε [1 kHz, 20° C.]: | 10.4 |
| CCP-3F•F | 3.00% | γ₁ [mPa·s]: | 100 |
| CCP-1F•F•F | 7.00% | V₁₀ [V]: | 1.16 |
| CCP-2F•F•F | 2.00% | | |
| CCP-20CF₃ | 8.00% | | |
| CCP-30CF₃ | 8.00% | | |
| CGU-2-F | 9.00% | | |
| CCZU-2-F | 4.00% | | |
| CCZU-3-F | 5.00% | | |
| CGZP-2-OT | 9.00% | | |
| CGZP-3-OT | 6.00% | | |
| APUQU-2-F | 10.00% | | |

Example M19

| | | | |
|---|---|---|---|
| CC-3-V1 | 9.00% | Clearing point [° C.]: | 80.0 |
| CC-5-V | 15.00% | Δn [589 nm, 20° C.]: | 0.12 |
| CCP-5F•F | 10.00% | Δε [1 kHz, 20° C.]: | 9.6 |
| CCP-1F•F•F | 9.00% | γ₁ [mPa·s]: | 130 |
| CCP-2F•F•F | 8.00% | V₁₀ [V]: | 1.27 |
| PGU-2-F | 9.00% | | |
| PGU-3-F | 9.00% | | |
| PGU-5-F | 9.00% | | |
| CGZP-3-OT | 3.00% | | |
| CCGU-3-F | 5.00% | | |
| CBC-33 | 3.00% | | |
| CBC-53 | 3.00% | | |
| APU-3-F | 8.00% | | |

Example M20

| | | | |
|---|---|---|---|
| CCH-35 | 4.00% | Clearing point [° C.]: | 84.0 |
| CCP-2F•F | 17.00% | Δn [589 nm, 20° C.]: | 0.070 |
| CCP-5F•F | 15.00% | γ₁ [mPa·s]: | 159 |
| CCP-1F•F•F | 2.00% | V₁₀ [V]: | 1.30 |
| CCP-2F•F•F | 9.00% | | |
| CCP-20CF₃ | 2.00% | | |
| CCP-40CF₃ | 5.00% | | |
| CCZU-2-F | 4.00% | | |
| CCZU-3-F | 15.00% | | |
| APUQU-2-F | 2.00% | | |
| ACQU-3-F | 10.00% | | |
| ACU-2-F | 8.00% | | |
| ACU-3-F | 7.00% | | |

Example M21

| | | | |
|---|---|---|---|
| CCP-2F•F | 9.00% | Clearing point [° C.]: | 77.0 |
| CCP-3F•F | 9.00% | Δn [589 nm, 20° C.]: | 0.0795 |
| CDU-2-F | 7.00% | Δε [1 kHz, 20° C.]: | 10.0 |
| CDU-3-F | 9.00% | γ₁ [mPa·s]: | 98 |
| CDU-5-F | 4.00% | | |
| CCZU-2-F | 4.00% | | |
| CCZU-3-F | 10.50% | | |
| CCP-V-1 | 3.50% | | |
| PGU-2-F | 9.00% | | |

-continued

| | |
|---|---|
| CC-3-V1 | 11.00% |
| CCH-35 | 5.00% |
| CC-5-V | 11.00% |
| ACU-3-F | 8.00% |

Example M22

| | | | |
|---|---|---|---|
| PGU-2-F | 9.00% | Clearing point [° C.]: | 80.0 |
| PGU-3-F | 8.50% | Δn [589 nm, 20° C.]: | 0.1094 |
| CGZP-2-OT | 8.50% | Δε [1 kHz, 20° C.]: | 11.0 |
| CGZP-3-OT | 5.00% | $\gamma_1$ [mPa · s]: | 107 |
| CCZU-2-F | 4.00% | | |
| CCZU-3-F | 13.00% | | |
| BCH-2F•F | 6.00% | | |
| CCP-2F•F | 7.50% | | |
| CCGU-3-F | 3.50% | | |
| CC-3-V1 | 12.00% | | |
| CC-5-V | 16.00% | | |
| APU-2-F | 7.00% | | |

Example M23

| | | | |
|---|---|---|---|
| CCH-5CF$_3$ | 4.00% | Clearing point [° C.]: | 78.0 |
| CCP-2F•F•F | 4.00% | Δn [589 nm, 20° C.]: | 0.0660 |
| CCP-3F•F•F | 3.00% | Δε [1 kHz, 20° C.]: | 12.2 |
| CCP-5F•F•F | 2.00% | | |
| ACQU-3-F | 12.00% | | |
| ACQU-4-F | 13.00% | | |
| CCAU-3-F | 5.00% | | |
| CCZU-2-F | 5.00% | | |
| CCZU-3-F | 15.00% | | |
| CCZU-5-F | 4.00% | | |
| CCH-301 | 5.00% | | |
| CCH-501 | 6.00% | | |
| CDU-3-F | 4.00% | | |
| CDU-5-F | 5.00% | | |
| ECCP-2F•F•F | 4.00% | | |
| ECCP-3F•F•F | 4.00% | | |
| ECCP-5F•F•F | 5.00% | | |

Example M24

| | | | |
|---|---|---|---|
| CCP-1F•F•F | 9.00% | Clearing point [° C.]: | 78.3 |
| CCP-2F•F•F | 8.00% | Δn [589 nm, 20° C.]: | 0.0789 |
| CCP-3F•F•F | 6.00% | Δε [1 kHz, 20° C.]: | 11.6 |
| CCP-5F•F•F | 3.00% | $\gamma_1$ [mPa · s]: | 175 |
| CECU-2-F | 7.00% | | |
| CECU-3-F | 6.00% | | |
| CECU-5-F | 6.00% | | |
| ECCP-2F•F•F | 8.00% | | |
| ECCP-3F•F•F | 5.00% | | |
| ECCP-5F•F•F | 5.00% | | |
| PCH-7F•F•F | 8.00% | | |
| CCPU-3-F | 8.00% | | |
| CCPU-5-F | 7.00% | | |
| ACQU-3-F | 14.00% | | |

Example M25

| | | | |
|---|---|---|---|
| CCH-5CF$_3$ | 7.00% | Clearing point [° C.]: | 78.5 |
| CCP-2F•F•F | 5.00% | Δn [589 nm, 20° C.]: | 0.0661 |
| CCP-3F•F•F | 3.00% | Δε [1 kHz, 20° C.]: | 11.9 |
| CCP-5F•F•F | 2.00% | $\gamma_1$ [mPa · s]: | 143 |
| ACQU-3-F | 13.00% | | |
| ACQU-4-F | 12.00% | | |
| CCAU-3-F | 5.00% | | |
| CCZU-2-F | 5.00% | | |
| CCZU-3-F | 15.00% | | |
| CCZU-5-F | 4.00% | | |
| CCH-301 | 5.00% | | |
| OCH-501 | 5.00% | | |
| CDU-3-F | 4.00% | | |
| CDU-5-F | 6.00% | | |
| CCP-3F•F | 4.00% | | |
| CCP-5F•F | 5.00% | | |

Example M26

| | | | |
|---|---|---|---|
| CCP-1F•F•F | 10.00% | Clearing point [° C.]: | 78.5 |
| CCP-2F•F•F | 9.00% | Δn [589 nm, 20° C.]: | 0.0790 |
| CCP-3F•F•F | 8.00% | Δε [1 kHz, 20° C.]: | 10.2 |
| CCP-5F•F•F | 4.00% | $\gamma_1$ [mPa · s]: | 144 |
| CCP-20CF$_3$•F | 10.00% | | |
| CCP-50CF$_3$•F | 7.00% | | |
| CCP-2F•F | 9.00% | | |
| CCP-3F•F | 8.00% | | |
| CCP-5F•F | 8.00% | | |
| BCH-2F•F | 5.00% | | |
| BCH-3F•F | 4.00% | | |
| ACQU-3-F | 18.00% | | |

The entire disclosures of all applications, patents and publications, cited herein and of corresponding German application No. 10359470.1, filed Dec. 17, 2003 are incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A liquid-crystalline medium based on a mixture of polar compounds of positive dielectric anisotropy, comprising one or more pyran compounds of formula I

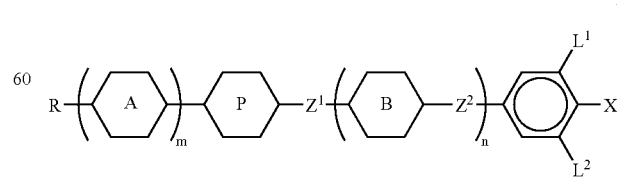

and one or more compounds of formulae C1, C2, C3, C4, C5, C6, C8 and/or C9

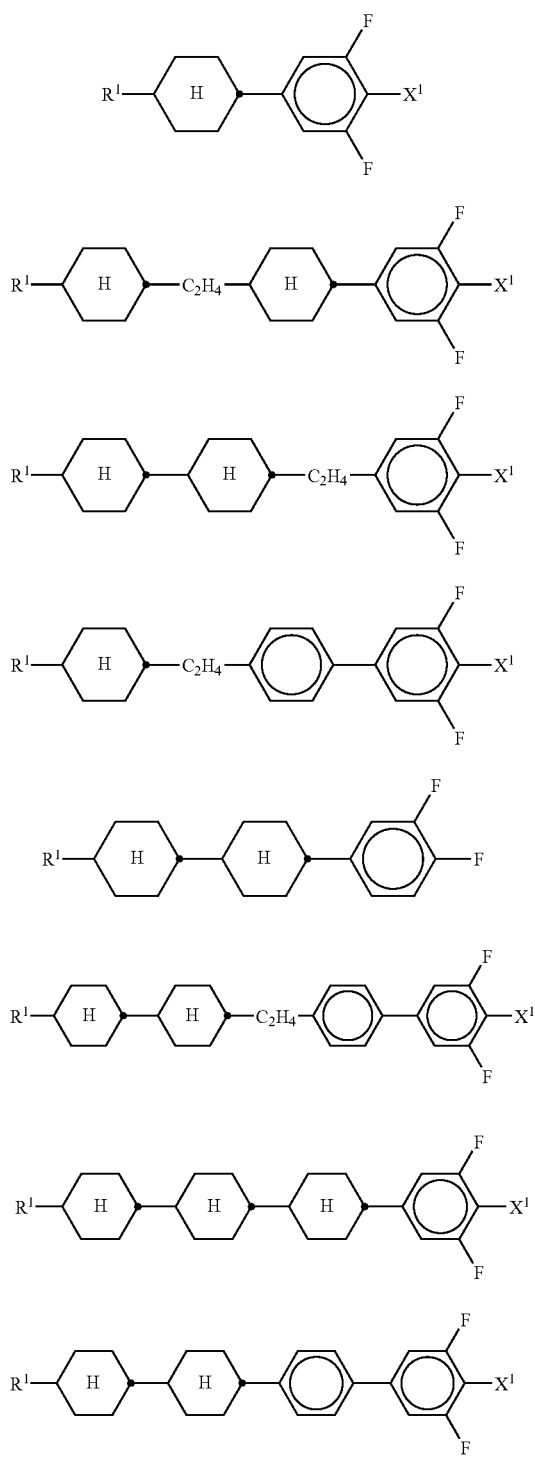

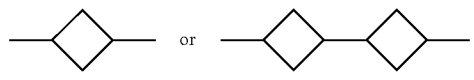

in such a way that O atoms are not linked directly to one another,

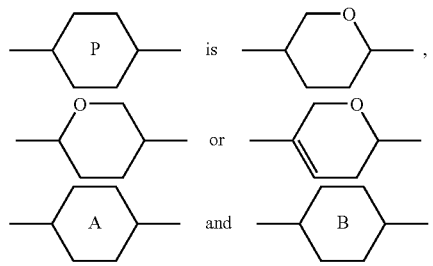

are each, independently of one another,

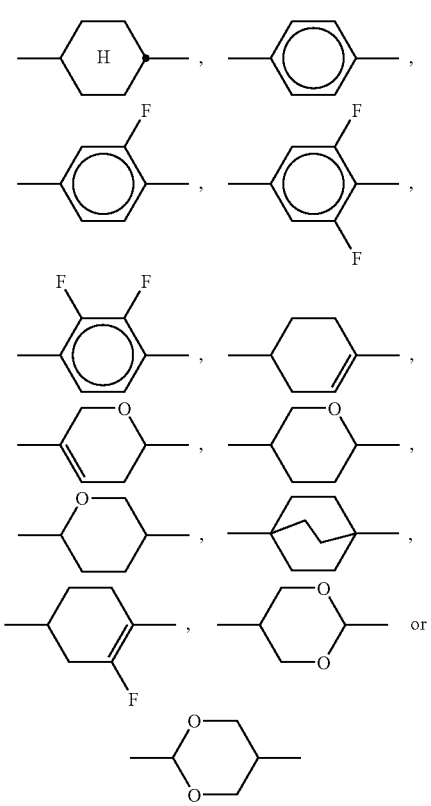

wherein

R and R$^1$ are each, independently of one another, H, a halogenated or unsubstituted alkyl or alkoxy radical having 1 to 15 carbon atoms, wherein one or more CH$_2$ groups are optionally each, independently of one another, replaced by —C≡C—, —CH=CH—, —O—, —CO—O—, —O—CO—, X and X$^1$ are each, independently of one another, F, Cl, SF$_5$, NCS, a halogenated alkyl radical having up to 8 carbon atoms, wherein one or more CH$_2$ groups are optionally replaced by —O— or —CH=CH— in such a way that O atoms are not linked directly to one another, Z$^1$ and Z$^2$ are each, independently of one another, —COO—, —OCO—, —CH$_2$O—, —OCH$_2$—, —CF$_2$CF$_2$—, —CF=CF—, —C≡C—, —CF$_2$O—, —OCF$_2$—, —CH=CF—, —CF=CH—, —CH$_2$CH$_2$—, —(CH$_2$)$_4$—, —CH=CH— or a single bond, $L^1$ and $L^2$ are each, independently of one another, H or F, and m and n are each, independently of one another, 0, 1, 2 or 3, where m+n is $\leq 3$ with the proviso that said medium does not contain compounds having the backbone unit structure

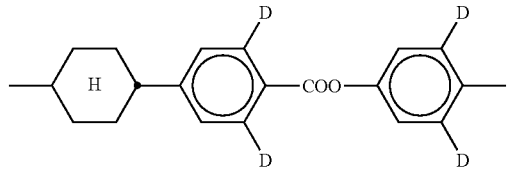

where D is H or F.

2. A liquid-crystalline medium according to claim 1, wherein X and $X^1$ are each, independently of one another, F, Cl, NCS, $CF_3$, $C_2F_5$, $C_3F_7$, $SF_5$, $CF_2H$, $OCF_3$, $OCF_2H$, $OCFHCF_3$, $OCFHCFH_2$, $OCFHCF_2H$, $OCF_2CH_3$, $OCF_2CFH_2$, $OCF_2CF_2H$, $OCF_2CF_2CF_2H$, $OCF_2GF_2CFH_2$, $OCFHCF_2CF_3$, $OCFHCF_2CF_2H$, $OCF_2CF_2CF_3$ or $OCF_2CHFCF_3$.

3. A liquid-crystalline medium based on a mixture of polar compounds of positive dielectric anisotropy, comprising one or more pyran compounds of formula I

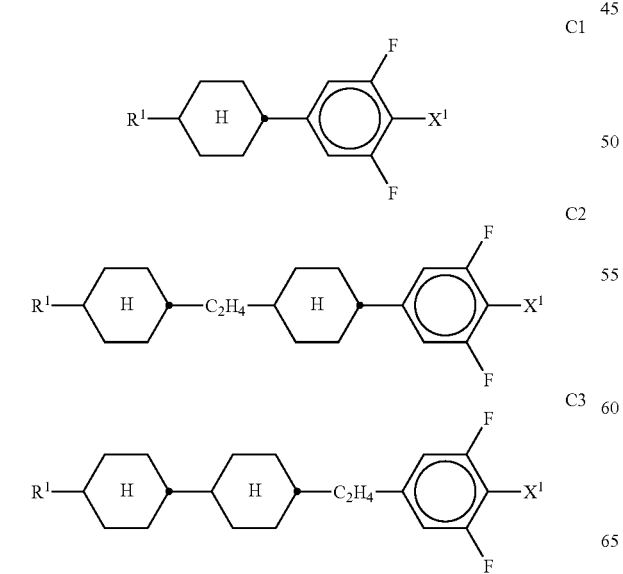

and one or more compounds of formulae C1, C2, C3, C4, C5, C6, C8 and/or C9

C1
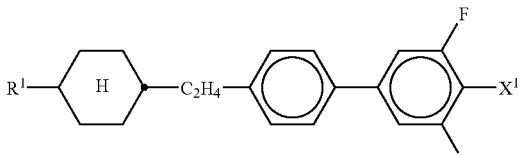

C2
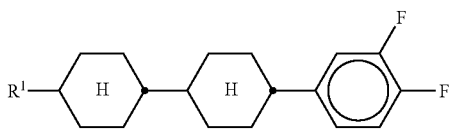

C3
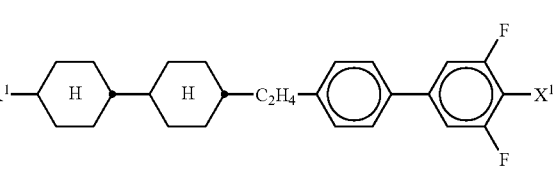

C4
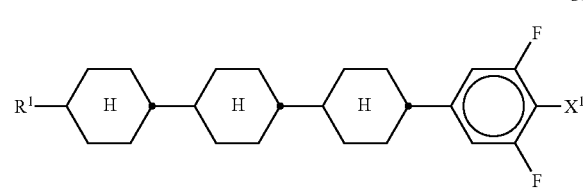

C5
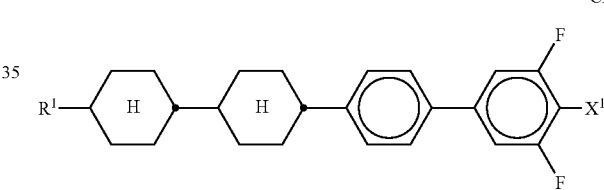

C6

C8

C9 wherein

R and $R^1$ are each, independently of one another, H, a halogenated or unsubstituted alkyl or alkoxy radical having 1 to 15 carbon atoms, wherein one or more $CH_2$ groups are optionally each, independently of one another, replaced by —C≡C—, —CH=CH—, —O—, —CO—O—, —O—CO—,

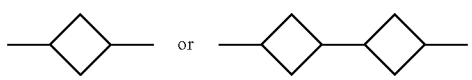

in such a way that O atoms are not linked directly to one another,

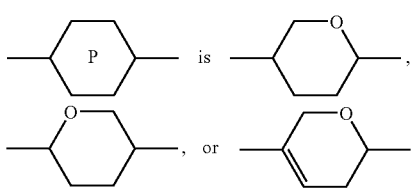

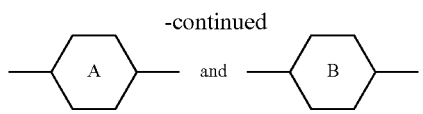

are each, independently of one another,

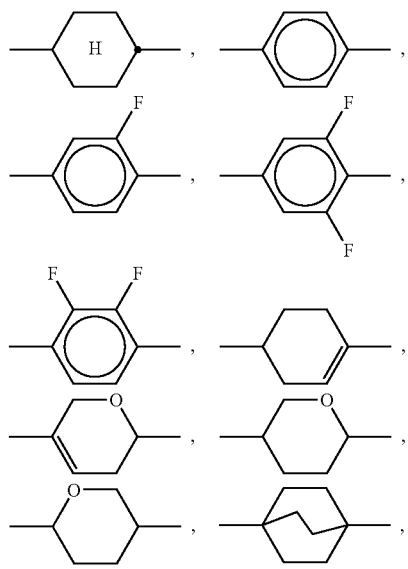

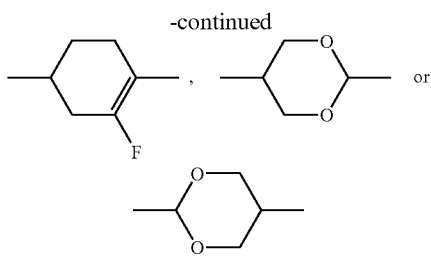

X and $X^1$ are each, independently of one another, F, Cl, $SF_5$, NCS, a halogenated alkyl radical having up to 8 carbon atoms, wherein one or more $CH_2$ groups are optionally replaced by —O— or —CH=CH— in such a way that O atoms are not linked directly to one another, $Z^1$ and $Z^2$ are each, independently of one another, —COO—, —OCO—, —CH$_2$O—, —OCH$_2$—, —CF$_2$CF$_2$—, —CF=CF—, —C≡C—, —CF$_2$O—, —OCF$_2$—, —CH=CF—, —CF=CH—, —CH$_2$CH$_2$—, —(CH$_2$)$_4$—, —CH=CH— or a single bond, $L^1$ and $L^2$ are each, independently of one another, H or F, and m and n are each, independently of one another, 0, 1, 2 or 3, where m+n is ≦3 wherein at least one compound of formula I is of formulae I1 to I15

I1

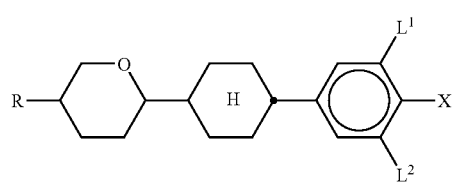

I2

I3

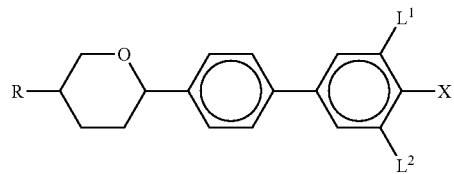

I4

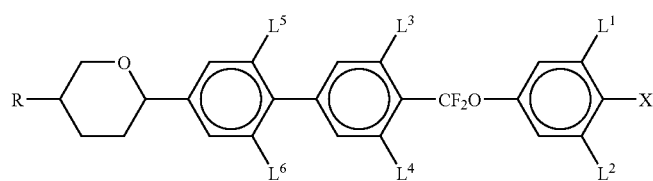

I5

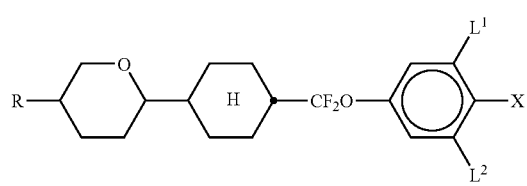

I6

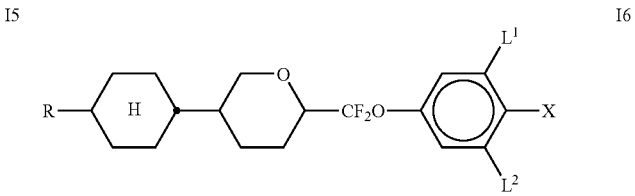

-continued
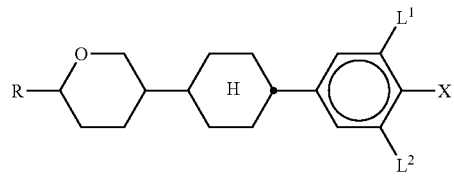
I7
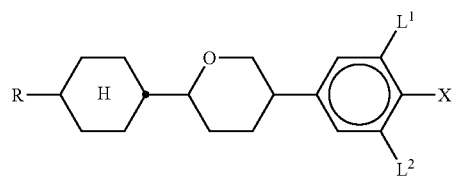
I8
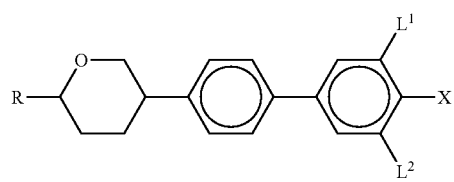
I9
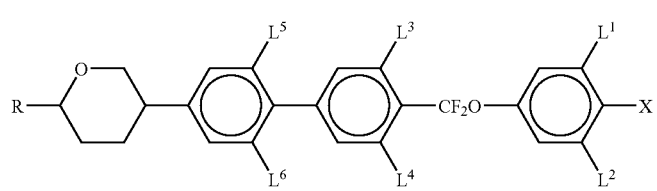
I10
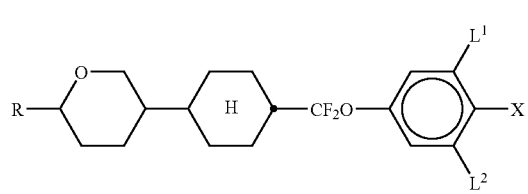
I11
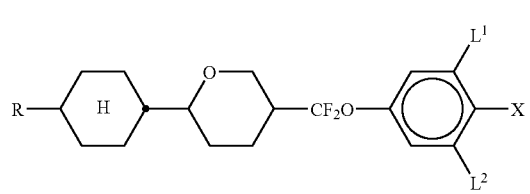
I12
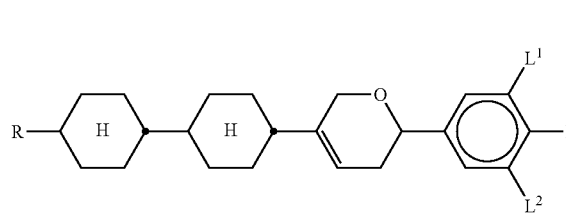
I13
I14
I15
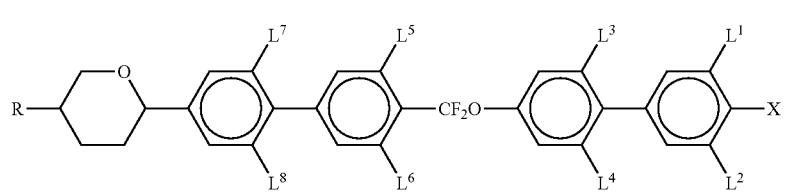

wherein $L^3$, $L^4$, $L^5$, $L^6$, $L^7$, and $L^8$ are, each independently of one another, H or F.

4. A liquid-crystalline medium according to claim 1, further comprising one or more compounds of formulae II, III, IV, V, VI, VII, VIII, IX and/or X:

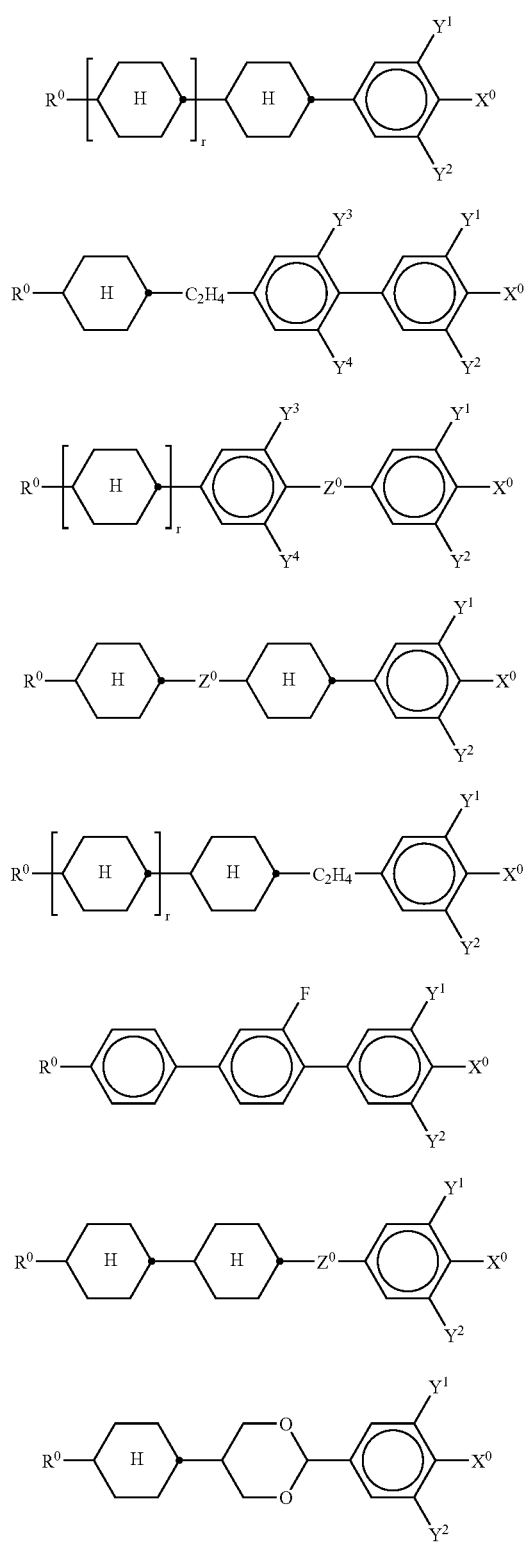

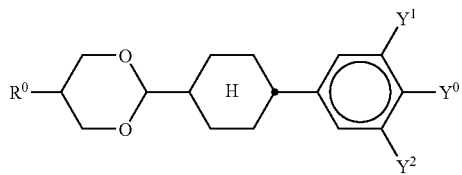

wherein $R^0$ is n-alkyl, alkoxy, oxaalkyl, fluoroalkyl, alkenyloxy or alkenyl, each having 2 to 12 carbon atoms, $X^0$ is F, Cl, halogenated alkyl, halogenated alkenyl, halogenated alkenyloxy or halogenated alkoxy, each having up to 8 carbon atoms, $Z^0$ is —CH=CH—, —CH$_2$O—, —OCH$_2$—, —(CH$_2$)$_4$—, —C$_2$H$_4$—, —C$_2$F$_4$—, —C≡C—, —CH=CF—, —CF=CH—, —CF=CF—, —CF$_2$O—, —OCF$_2$— or —COO—, $Y^1$, $Y^2$, $Y^3$ and $Y^4$ are each, independently of one another, H or F, and r is 0 or 1, wherein the compounds of formulae II, III, V and/or VIII are not identical with the one or more compounds of formulae C1 to C5.

5. A liquid-crystalline medium according to claim 4, wherein the proportion of compounds of formulae I to X in the mixture as a whole is at least 50% by weight.

6. A liquid-crystalline medium according to claim 1, further comprising one or more compounds of formulae RI to RXVI

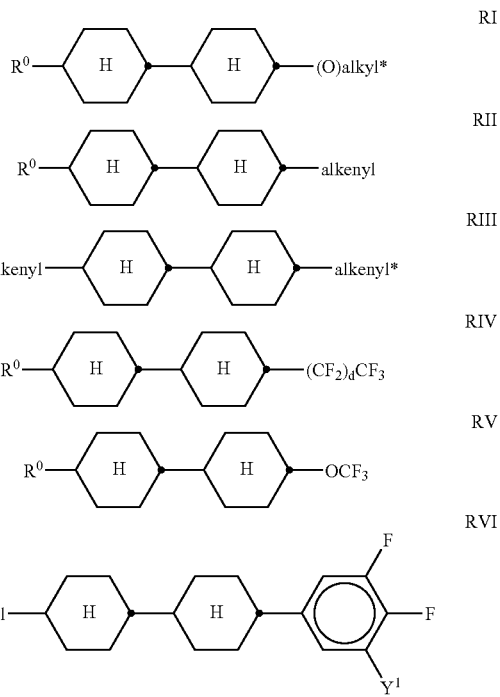

-continued

RVII
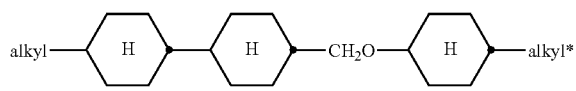

RVIII

RIX
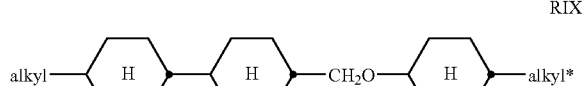

RX
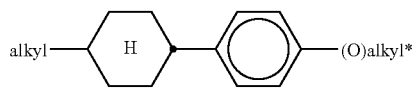

RXI
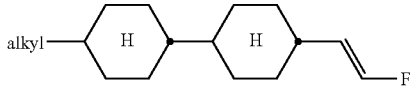

RXII
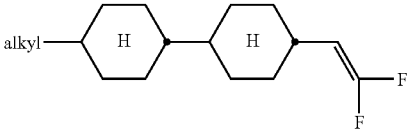

RXIII

RXIV

RXV
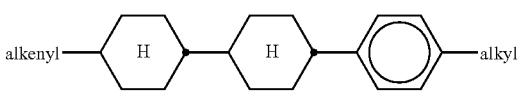

RXVI

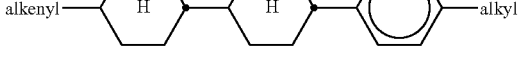

wherein
$R^0$ is n-alkyl, oxaalkyl, fluoroalkyl, alkenyloxy or alkenyl, each having 1 to 12 carbon atoms,
d is 0, 1 or 2,
$Y^1$ is H or F,
alkyl and
alkyl* are each, independently of one another, a straight-chain or branched alkyl radical having 2 to 8 carbon atoms, and
alkenyl and alkenyl* are each, independently of one another, a straight-chain or branched alkenyl radical having 2 to 8 carbon atoms.

7. A liquid-crystalline medium according to claim 4, wherein $X^0$ is F, Cl, $OCHF_2$ or $OCF_3$, and $Y^2$ is H or F.

8. An electro-optical liquid-crystal display containing a liquid-crystalline medium according to claim 1.

9. A liquid crystalline medium based on a mixture of polar compounds of positive dielectric anisotropy, comprising one or more pyran compounds of formula I I
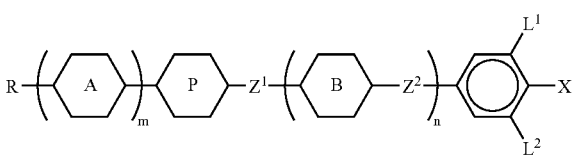

and one or more compounds of formulae C1, C2, C3, C4, C5, C6, c8 and/or C9

C1
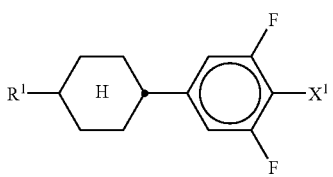

C2
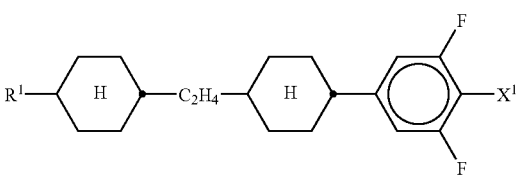

C3
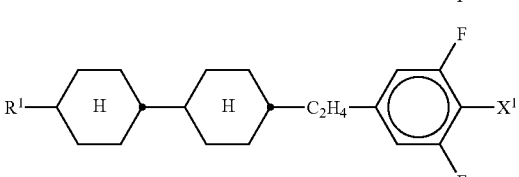

C4
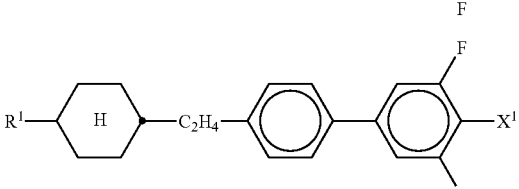

C5
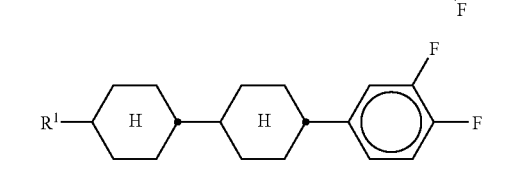

C6
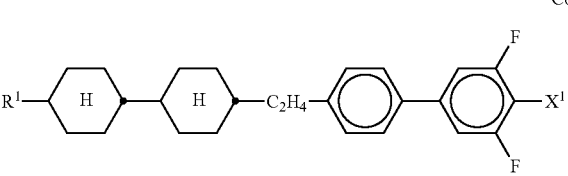

-continued

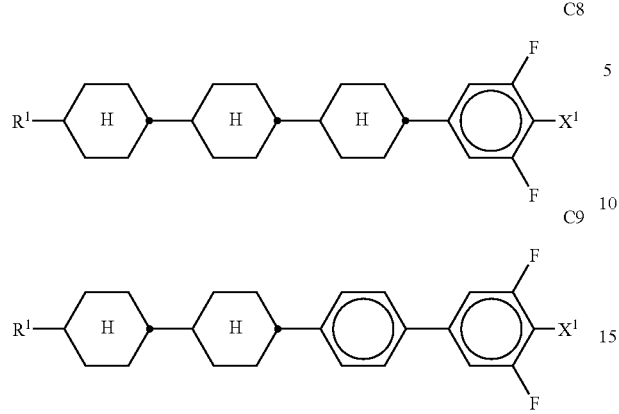

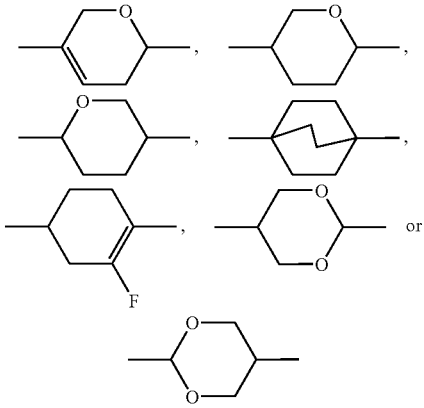

wherein

R and R¹ are each, independently of one another, H, a halogenated or unsubstituted alkyl or alkoxy radical having 1 to 15 carbon atoms, wherein one or more $OH_2$ groups are optionally each, independently of one another, replaced by —C≡C—, —CH═CH—, —O—, —CO—O—, —O—CO—,

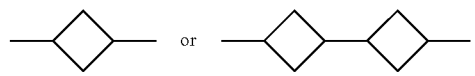

in such a way that O atoms are not linked directly to one another,

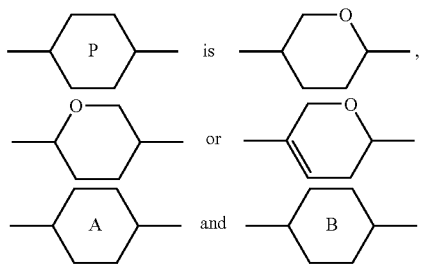

are each, independently of one another,

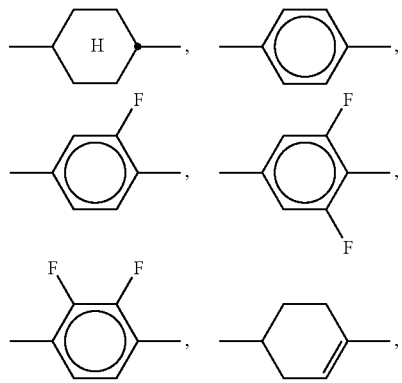

X and X¹ are each, independently of one another, F, Cl, $SF_5$, NCS, a halogenated alkyl radical having up to 8 carbon atoms, wherein one or more $CH_2$ groups are optionally replaced by —O— or —CH═CH— in such a way that O atoms are not linked directly to one another, $Z^1$ and $Z^2$ are each, independently of one another, —COO—, —OCO—, —$CH_2$O—, —O$CH_2$—, —$CF_2CF_2$—, —CF═CF—, —C≡C—, —$CF_2$O—, —O$CF_2$—, —CH═CF—, —CF═CH—, —$CH_2CH_2$—, —$(CH_2)_4$—, —CH═CH— or a single bond, $L^1$ and $L^2$ are each, independently of one another, H or F, and m and n are each, independently of one another, 0, 1, 2 or 3, where m+n is ≦3, wherein the compound of Formula I is not

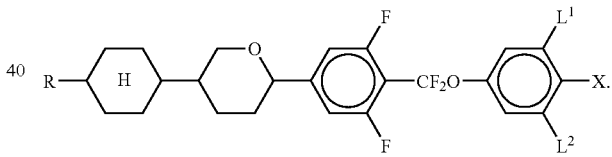

10. A medium of claim 9 wherein pyran rings are not adjacent.

11. A medium of claim 1 wherein n is, independently of m, 1, 2, or 3 and m+n is ≦3 and wherein $Z^1$ and $Z^2$ are both —$CF_2$O— or —O$CF_2$—, or $Z^1$ is —$CF_2$O— and $Z^2$ is —O$CF_2$—, or $Z^1$ is —O$CF_2$— and $Z^2$ is —$CF_2$O—.

12. A liquid-crystalline medium according to claim 3, wherein X and X¹ are each, independently of one another, F, Cl, NCS, $CF_3$, $C_2F_5$, $C_3F_7$, $SF_5$, $CF_2H$, $OCF_3$, $OCF_2H$, $OCFHCF_3$, $OCFHCFH_2$, $OCFHCF_2H$, $OCF_2CH_3$, $OCF_2CFH_2$, $OCF_2CF_2H$, $OCF_2CF_2CF_2H$, $OCF_2CF_2CFH_2$, $OCFHCF_2CF_3$, $OCFHCF_2CF_2H$, $OCF_2CF_2CF_3$ or $OCF_2CHFCF_3$.

13. A liquid-crystalline medium according to claim 9, wherein X and X¹ are each, independently of one another, F, Cl, NCS, $CF_3$, $C_2F_5$, $C_3F_7$, $SF_5$, $CF_2H$, $OCF_3$, $OCF_2H$, $OCFHCF_3$, $OCFHCFH_2$, $OCFHCF_2H$, $OCF_2CH_3$, $OCF_2CFH_2$, $OCF_2CF_2H$, $OCF_2CF_2CF_2H$, $OCF_2CF_2CFH_2$, $OCFHCF_2CF_3$, $OCFHCF_2CF_2H$, $OCF_2CF_2CF_3$ or $OCF_2CHFCF_3$.

14. A medium of claim 1 wherein pyran rings are not adjacent.

15. A medium of claim 3 wherein
n is, independently of m, 1, 2, or 3 and m+n is $\leq 3$ and wherein
$Z^1$ and $Z^2$ are both —CF$_2$O— or —OCF$_2$—, or
$Z^1$ is —CF$_2$O— and $Z^2$ is —OCF$_2$—, or
$Z^1$ is —OCF$_2$— and $Z^2$ is —CF$_2$O—.

16. A medium of claim 3 wherein pyran rings are not adjacent.

17. A medium of claim 9 wherein
n is, independently of m, 1, 2, or 3 and m+n is $\leq 3$ and wherein
$Z^1$ and $Z^2$ are both —CF$_2$O— or —OCF$_2$—, or
$Z^1$ is —CF$_2$O— and $Z^2$ is —OCF$_2$—, or
$Z^1$ is —OCF$_2$— and $Z^2$ is —CF$_2$O—.

18. An electro-optical liquid-crystal display containing a liquid-crystalline medium according to claim 12.

19. An electro-optical liquid-crystal display containing a liquid-crystalline medium according to claim 9.

20. A liquid-crystalline medium according to claim 9, further comprising
A) one or more compounds of formulae II, III, IV, V, VI, VII, VIII, IX and/or X:

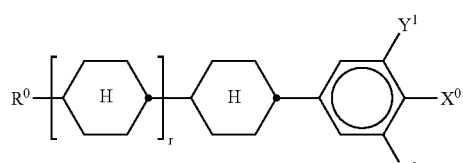
X

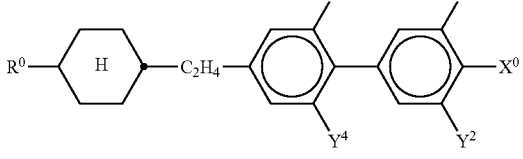
XI

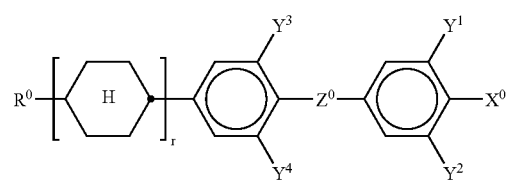
XII

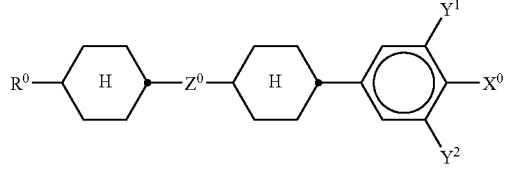
XIII

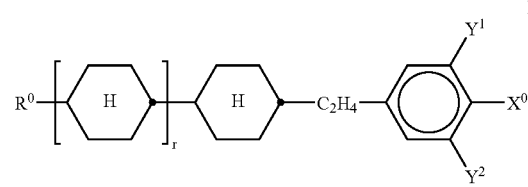
XIV

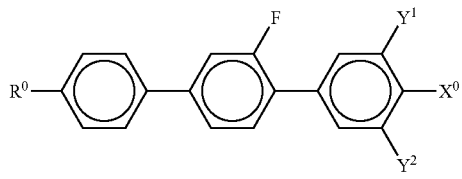
XV

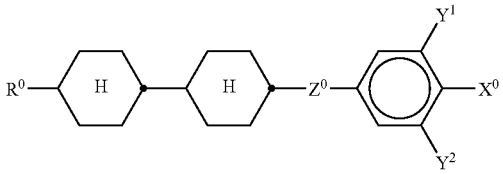
XVI

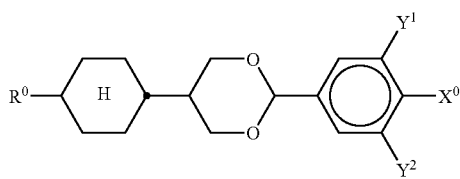
XVII

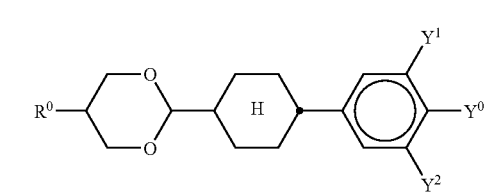
XI wherein
$R^0$ is n-alkyl, alkoxy, oxaalkyl, fluoroalkyl, alkenyloxy or alkenyl, each having 2 to 12 carbon atoms,
$X^0$ is F, Cl, halogenated alkyl, halogenated alkenyl, halogenated alkenyloxy or halogenated alkoxy, each having up to 8 carbon atoms,
$Z^0$ is —CH=CH—, —CH$_2$O—, —OCH$_2$—, —(CH$_2$)$_4$—, —C$_2$H$_4$—, —C$_2$F$_4$—, —C≡C—, —CH=CF—, —CF=CH—, —CF=CF—, —CF$_2$O—, —OCF$_2$— or —COO—,
$Y^1$, $Y^2$,
$Y^3$ and $Y^4$ are each, independently of one another, H or F, and
r is 0 or 1,
wherein the compounds of formulae II, III, V and/or VIII are not identical with the one or more compounds of formulae C1 to C5; and/or B) one or more compounds of formulae RI to RXVI

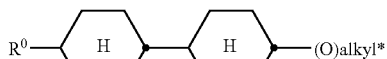
RXV

RXVI

RXVII

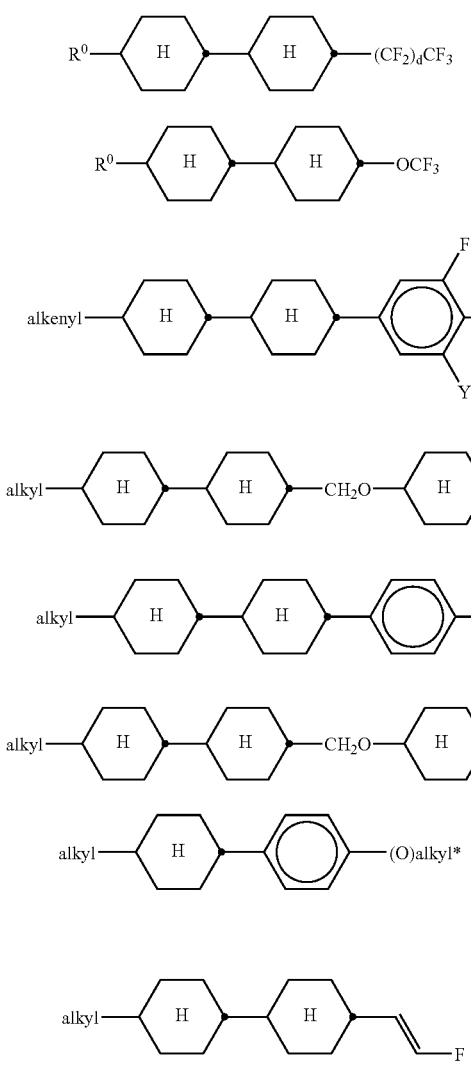
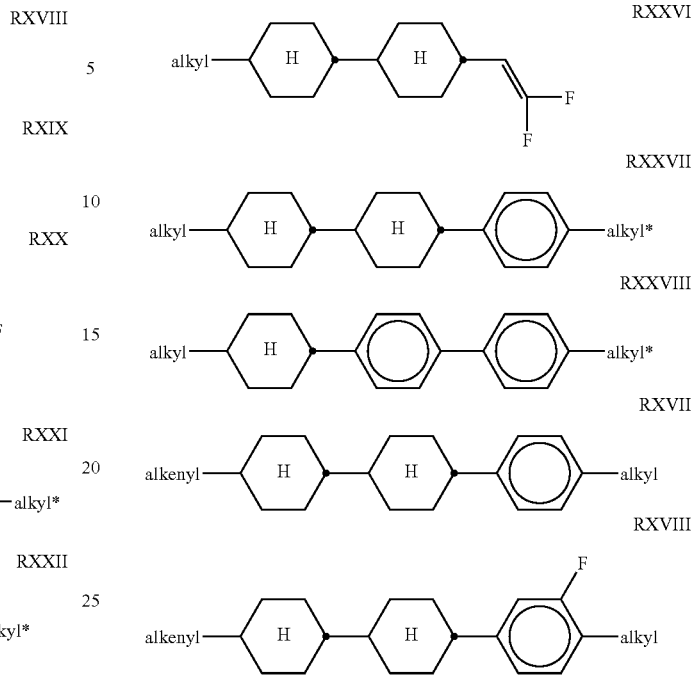

wherein
$R^0$ is n-alkyl, oxaalkyl, fluoroalkyl, alkenyloxy or alkenyl, each having 1 to 12 carbon atoms,
d is 0, 1 or 2,
$Y^1$ is H or F,
alkyl and
alkyl* are each, independently of one another, a straight-chain or branched alkyl radical having 2 to 8 carbon atoms, and
alkenyl and
alkenyl* are each, independently of one another, a straight-chain or branched alkenyl radical having 2 to 8 carbon atoms.

\* \* \* \* \*

UNITED STATES PATENT AND TRADEMARK OFFICE
CERTIFICATE OF CORRECTION

PATENT NO. : 7,449,222 B2 Page 1 of 1
APPLICATION NO. : 11/014185
DATED : November 11, 2008
INVENTOR(S) : Michael Heckmeier It is certified that error appears in the above-identified patent and that said Letters Patent is hereby corrected as shown below:

Title page, Item (75), Inventors: line 4, reads "Peterhausen" should read
-- Petershausen --

Title page, Item (75), Inventors: line 5, reads "Muchltal" should read -- Muehltal --

Column 87, line 25, reads "$OCF_2GF_2CFH_2$" should read -- $OCF_2CF_2CFH_2$ --

Column 96, line 23, reads "C6, c8" should read -- C6, C8 --

Column 97, line 23, reads "one or more $OH_2$" should read -- one or more $CH_2$ --

Signed and Sealed this

Twenty-fourth Day of March, 2009

JOHN DOLL
*Acting Director of the United States Patent and Trademark Office*